US012545033B2

(12) United States Patent
Boucher et al.

(10) Patent No.: US 12,545,033 B2
(45) Date of Patent: Feb. 10, 2026

(54) MULTI-POLE PRINTING SYSTEM AND METHOD

(71) Applicant: Illinois Tool Works Inc., Glenview, IL (US)

(72) Inventors: Timothy Joseph Boucher, Dillsburg, PA (US); Ryan Patrick Boucher, Chicago, IL (US); Jack Quillin, Willowbrook, IL (US); Brian Schwartz, Lake Zurich, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/406,206

(22) Filed: Jan. 7, 2024

(65) Prior Publication Data

US 2024/0227415 A1 Jul. 11, 2024

Related U.S. Application Data

(60) Provisional application No. 63/438,086, filed on Jan. 10, 2023.

(51) Int. Cl.

| | |
|---|---|
| ***B41J 3/407*** | (2006.01) |
| ***B41J 2/32*** | (2006.01) |
| ***B41M 5/00*** | (2006.01) |

(52) U.S. Cl.

CPC ............. *B41J 3/40733* (2020.08); *B41J 2/32* (2013.01); *B41M 5/0094* (2013.01)

(58) Field of Classification Search

CPC ....... B41J 2/32; B41J 3/40733; B41M 5/0094

See application file for complete search history.

(56) References Cited

U.S. PATENT DOCUMENTS

| | | |
|---|---|---|
| 4,839,522 A | 6/1989 | Bourgeois |
| 5,226,361 A | 7/1993 | Grant |
| 5,778,793 A | 7/1998 | Mello et al. |
| 6,524,419 B1 | 2/2003 | Dabrowski, Jr. et al. |
| 6,923,115 B1 | 8/2005 | Litscher et al. |

(Continued)

FOREIGN PATENT DOCUMENTS

| | | |
|---|---|---|
| EP | 1159138 A1 | 12/2001 |
| EP | 1159138 B1 | 7/2003 |

(Continued)

OTHER PUBLICATIONS

International Search Report and Written Opinion mailed Apr. 23, 2024 for PCT/US2024/010903 (12 pages).

(Continued)

*Primary Examiner* — Christopher E Mahoney
*Assistant Examiner* — Marissa Ferguson-Samreth
(74) *Attorney, Agent, or Firm* — Carroll, Hoette & Butscher LLC; Christopher R. Carroll

(57) ABSTRACT

A printing system is provided that may include plural stations that load objects to be printed upon into the printing system, print indicia on the objects, cure the indicia printed on the objects, inspect the indicia printed on the objects, re-orient the objects, and/or unload the objects from the printing system. The printing system also may include a conveyance assembly extending between the stations. The conveyance assembly may independently and/or separately move the objects between or among the stations.

20 Claims, 19 Drawing Sheets

(56) References Cited

U.S. PATENT DOCUMENTS

| | | | |
|---|---|---|---|
| D525,325 | S | 7/2006 | Hanna, Sr. |
| 7,387,070 | B1 * | 6/2008 | Mydlack ............... B41F 17/001 101/493 |
| 7,448,323 | B2 | 11/2008 | Kennedy, III et al. |
| 9,044,650 | B2 | 6/2015 | Kuntimaddi |
| 9,114,282 | B2 | 8/2015 | Kennedy, III |
| 9,283,443 | B1 | 3/2016 | Hanna et al. |
| 10,611,181 | B1 * | 4/2020 | Moylan ................. B41F 23/005 |
| 10,933,626 | B1 * | 3/2021 | Bullington ........... B41M 7/0081 |
| 10,946,639 | B1 * | 3/2021 | Bullington .............. B41F 31/08 |
| 11,013,961 | B2 | 5/2021 | Fox et al. |
| 2002/0032076 | A1 | 3/2002 | Isogawa et al. |
| 2002/0097280 | A1 | 7/2002 | Loper et al. |
| 2003/0106442 | A1 | 6/2003 | Gosetti |
| 2009/0031904 | A1 | 2/2009 | Vieira et al. |
| 2011/0100241 | A1 | 5/2011 | Vogt |
| 2011/0292146 | A1 | 12/2011 | Sigismondo |
| 2013/0326959 | A1 * | 12/2013 | Gipson ................ A01K 1/0613 49/357 |
| 2017/0066232 | A1 | 3/2017 | Litvinov et al. |
| 2022/0047923 | A1 | 2/2022 | Durham |
| 2023/0191207 | A1 | 6/2023 | Maher |

FOREIGN PATENT DOCUMENTS

| | | | | |
|---|---|---|---|---|
| JP | 2010265066 A | * | 11/2010 | |
| WO | WO-2021167642 A1 | * | 8/2021 | .......... B41F 13/0024 |

OTHER PUBLICATIONS

International Preliminary Report on Patentability mailed Jul. 28, 2025 for PCT/US2024/010903 (9 pages).

* cited by examiner

MULTI-POLE PRINTING SYSTEM AND METHOD

CROSS-REFERENCE TO RELATED APPLICATIONS

This application claims priority to U.S. Provisional Application No. 63/438,086 (filed 10 Jan. 2023), the entire disclosure of which is incorporated herein by reference.

BACKGROUND

Technical Field

The subject matter described herein relates to systems and methods that can print indicia (e.g., text, images, etc.) onto objects of various sizes by rotating or otherwise moving the objects around various poles or axes.

Discussion of Art

Some objects may be printed upon by rotating the objects around axes. For example, golf balls may be printed upon by rotating a golf ball around a first axis, stopping rotation at different times while a printing apparatus (e.g., a stamp printer) applies ink to the surface of the golf ball, re-orienting the golf ball, rotating the golf ball around a second axis that differs from the first axis, stopping rotation at different times while the printing apparatus applies ink to the surface of the golf ball, and so on. Optionally, the ink may be cured following one or more applications of the ink. The golf balls may be rotated around additional, different axes for additional printing.

The golf balls may move through these types of printing systems via a rotating table or surface. For example, a first orienting station may be at a first location along an outer perimeter of the table, a first printing station may be at a different, second location along the outer perimeter of the table, a first curing station may be at a different, third location along the outer perimeter of the table, a second orienting station may be at a different, fourth location along the outer perimeter of the table, a second printing station may be at a different, fifth location along the outer perimeter of the table, a second curing station may be at a different, sixth location along the outer perimeter of the table, and so on.

The orientating stations may change the orientation of the golf balls at those stations for rotation along a different axis than a pervious printing operation. The printing stations may print on the golf balls during rotation, and the curing stations may apply energy (e.g., light and/or heat) to cure the ink. The stations may be stationary, and the golf balls may be coupled with or disposed on the table. The table may rotate around a center axis that is between the various stations, similar to the center of a clock with the stations at different hour locations along the outer perimeter of the clock. This rotation may move the golf balls between and to the different stations. For example, while the first golf ball is at the first orienting station, a second golf ball may be at the first printing station, a third golf ball may be at the first curing station, and so on. Once the orienting, printing, and curing operations performed at these stations are completed on the respective golf balls, the table may rotate to move the first golf ball from the first orienting station to the first printing station, to move the second golf ball from the first printing station to the first curing station, to move the third golf ball from the first curing station to the second orienting station, and so on.

One problem with these types of table-based printing systems and methods is that slower stations may reduce the total output of the printing systems. For example, the printing stations may take longer to print on the golf balls at the printing stations than it takes the curing stations to complete curing of the inks. The orienting stations may take more time to reorient golf balls than curing the ink in the curing stations, but less time than printing on the golf balls at the printing stations. But because the golf balls move simultaneously between the stations due to rotation of the table, golf balls at stations that are downstream or subsequent to other, slower stations (e.g., along the path between the stations defined by rotation of the table) may be left waiting while the slower stations complete processing. For example, the golf ball at the final curing station may have curing completed but may not be able to be removed from the table (for packaging, inspection, or other post-printing operations) until the printing on another golf ball at a slower, upstream printing station is complete.

A need may exist for printing systems and methods that do not suffer from these drawbacks.

BRIEF DESCRIPTION

In one example, a printing system is provided that may include plural stations that load objects to be printed upon into the printing system, print indicia on the objects, cure the indicia printed on the objects, inspect the indicia printed on the objects, re-orient the objects, and/or unload the objects from the printing system. The printing system also may include a conveyance assembly extending between the stations. The conveyance assembly may independently and/or separately move the objects between or among the stations.

A method for printing also is provided. The method may include two or more of loading objects to be printed upon into the printing system, printing indicia on the objects, curing the indicia printed on the objects, inspecting the indicia printed on the objects, re-orienting the objects, and/or unloading the objects from the printing system. The method also may include independently or separately moving the objects between or among the stations.

In another example, a printing system is provided that may include stations configured to two or more of load objects to be printed upon into the printing system, print indicia on the objects during rotation of the objects around different axes, cure the indicia printed on the objects, inspect the indicia printed on the objects, re-orient the objects, or unload the objects from the printing system. The printing system also may include a conveyance assembly extending between the stations. The conveyance assembly may include shuttles that one or more of independently or separately move the objects between or among the stations such that the objects are moved different distances, different speeds, or both different distances and different speeds between or among the stations at a same time.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide printing systems and methods that may avoid or reduce throughput delays experienced by some known printing systems and methods. In contrast to using a rotating table to simultaneously move objects being printed upon between different stations, one or more embodiments of the inventive printing systems and methods may independently and/or separately move the objects between the different stations. For example, the printing systems relying on rotating tables may be limited to moving several objects between stations at the same time (as described above), thereby tying the movements of the objects together in that one object cannot move between stations without the other objects also moving between stations. This type of movement is both dependent on the movement of other objects (and does not allow independent movement of the objects) and involves group (and not separate) movement of the objects. The independent and/or separate movement of the objects through the inventive printing systems and methods described herein may increase throughput of the objects through the systems by faster stations that are downstream of slower stations to proceed with the processing of the objects to allow those objects to continue moving through and out of the printing systems.

Figure 1:
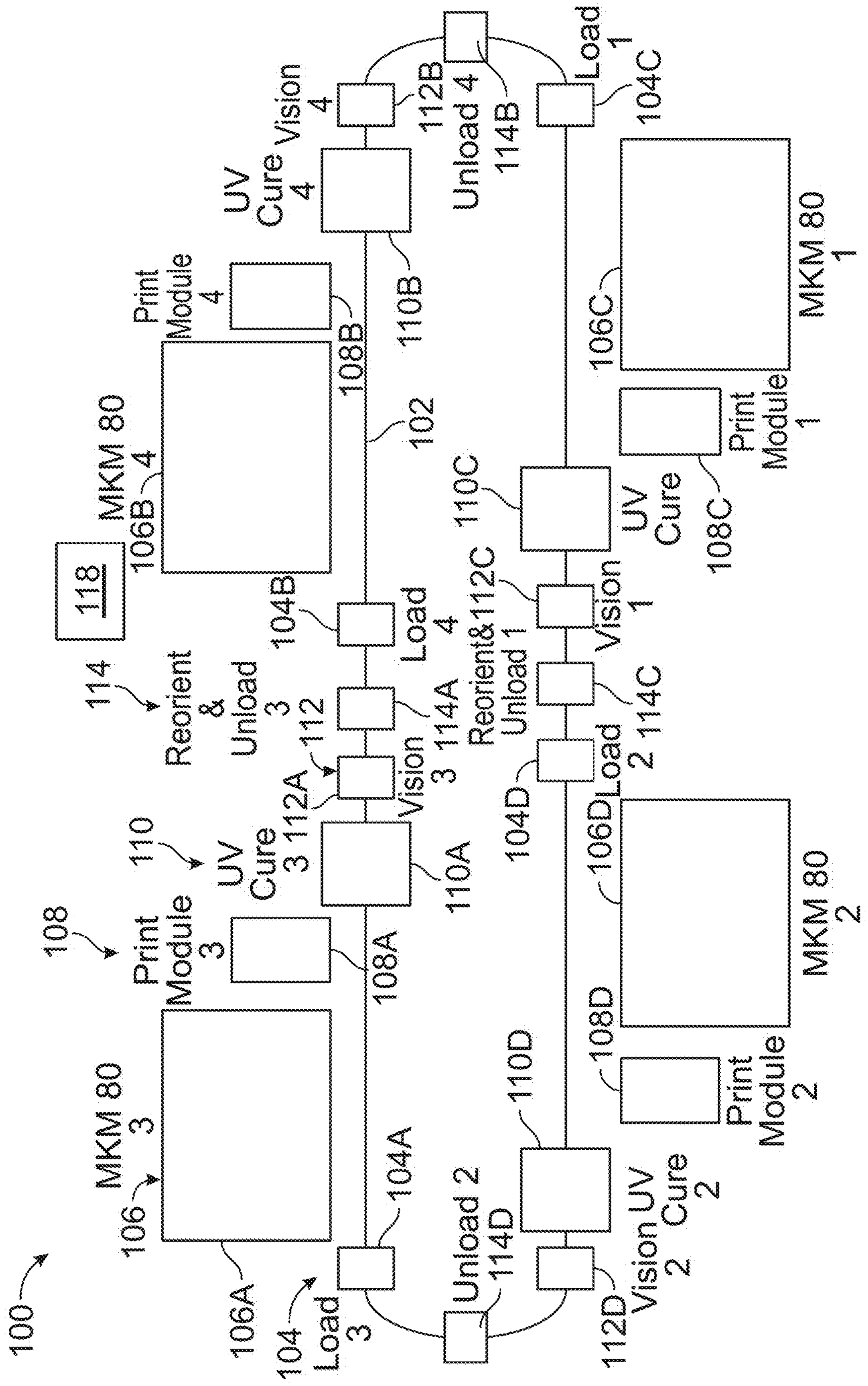
FIG. 1 illustrates one example of a printing system.

FIG. 1 illustrates one example of a printing system 100. The printing system 100 includes a conveyance assembly 102 that moves several shuttles (shown in FIGS. 2 and 3) around the printing system 100 between various stations 104, 106, 108, 110, 112, 114, 2200 (shown in FIG. 22) to print on objects (shown in FIGS. 2 and 3) in various locations.

The conveyance assembly 102 can represent one or more conveyors, tracks, or the like, that move (e.g., under control of motors or other actuators that are part of the conveyance assembly 102) the shuttles and objects between the different stations 104, 106, 108, 110, 112, 114. Optionally, the shuttles may be self-propelled and may move themselves along the conveyors, tracks, paths, etc., of the conveyance assembly 102. In the illustrated example, the conveyance assembly 102 forms the shape of a closed loop, oval racetrack. Alternatively, the conveyance assembly 102 may form the shape of another closed loop, such as a loop in the shape of a circle, ellipsoid, square, or the like. In another example, the conveyance assembly 102 may be open and not form a closed loop, such as where the conveyance assembly 102 has a starting end where the objects are loaded into the shuttles and an opposite terminal end where the objects are removed from the printing system 100 following completion of printing. The number and/or arrangement of the stations 104, 106, 108, 110, 112, 114 may be changed from the example shown in FIG. 1, and/or the printing system 100 may not include the stations 104, the stations 106, the stations 108, the stations 110, the stations 112, and/or the stations 114.

The printing system 100 can include a controller 118 that controls operation of the components of the printing system 100. Optionally, the printing system 100 may include several controllers 118 that control individual ones of the components of the printing system 100, or that control different sets or groups of the components of the printing system 100. The controller(s) 118 can control operation of the shuttles 200, the stations 104, 106, 108, 110, 112, 114, 2200, or the like. The controller(s) 118 can represent may be represented by hardware circuitry that includes and/or is connected with one or more processors internal or external to the shuttles 200 and/or the stations 104, 106, 108, 110, 112, 114, 2200. The controller(s) 118 can be connected with the shuttles 200 and/or stations 104, 106, 108, 110, 112, 114, 2200 via wired and/or wireless connections for communication of control signals and/or receipt of sensor or inspection signals.

The stations 104 (e.g., stations 104A-D) can represent loading stations where the objects are loaded into the shuttles. The objects may be manually loaded into the shuttles at the loading stations 104 or may be automatically dispensed into the shuttles from a hopper or other device. Under direction of control signals from the controller(s) 118, the conveyance assembly 102 may stop movement of a shuttle at one or more of the loading stations 104 or each loading station 104 to allow for placement of an object into or onto a shuttle. As shown in FIG. 1, several loading stations 104 are present between other stations 106, 116 in the printing system 100. This can allow for objects to be loaded into the printing system 100 at various locations or places along the flow of objects through the printing system 100. For example, in one example, an object may be loaded into, and carried through, all the stations 104, 106, 108, 110, 112, 114 in the printing system 100 before removing the object from the printing system 100. In another example, an object may be loaded into and carried through some, but not all, of the stations 104, 106, 108, 110, 112, 114 before removing the object from the printing system 100.

The stations 106, 108 (e.g., the stations 106A-D and the stations 108A-D) can represent printing stations that print or otherwise apply indicia onto the objects. The printing stations 106, 108 can include stamps that apply ink and/or labels to the objects by applying pressure and/or heat, can include inkjet printers, lasers, or the like, that form or apply text, images, numbers, or the like, to form the indicia on the objects. After the shuttle holding an object leaves the loading station 104 that is upstream of the printing station 106, the conveyance assembly 102 moves the shuttle to the printing station 106 that is downstream of the loading station 104 (e.g., moving from the loading station 104A to the printing station 106A, from the loading station 104B to the printing station 106B, and so on). The printing station 106 may apply the indicia to the object. The objects may have non-planar surfaces that are to be printed upon by the printing stations 106, 108. For example, the objects may be spherical, semi-spherical (e.g., golf balls), cylindrical (e.g., syringes, cans, containers, etc.), or the like. Optionally, the objects may have one or more planar surfaces on which printing occurs. In one example, the printing station 106 may rotate the object around an axis during printing to apply the indica in several different locations around the object. This can be used, for example, to print a repeating pattern, array, or the like, of a logo or other indicia onto a golf ball or other object.

Following printing on the object at the printing station 106, the conveyance assembly 102 may move the shuttle to the next downstream printing station 108. The printing station 108 may apply additional indicia to the object. The printing station 108 may rotate the object around an axis during printing to apply the indica in several different locations around the object. The axis around or about which the object is rotated during printing in the printing stations 106, 108 can be the same or different axes. The printing stations 106, 108 may print the same or different indicia on the same object, and/or the printing stations 106, 108 may print the same or different colors of ink onto the same object. For example, the printing station 106A may print a first logo or first portion of the first logo in a first color, and the printing station 106B may print a different, second logo or a different, second portion of the first logo in the first color or a different, second color. Alternatively, the printing system 100 may not include the printing stations 106 or the printing stations 108.

Following printing on the object at the printing station(s) 106, 108, the conveyance assembly 102 may move the shuttle to the next downstream station 110. The stations 110 can represent curing stations that apply heat or light (e.g., UV light) to cure the indicia applied onto the object by the printing stations 106, 108. For example, after printing ink(s) onto the object at the printing stations 106C, 108C, the curing station 110C can include a UV lamp that generates UV light and/or can include heating elements that generate heat to cure the ink on the object. Optionally, the printing system 100 does not include one or more of the curing stations 110.

Following curing the indicia at the curing station 110, the conveyance assembly 102 may move the shuttle to the next downstream station 112. The stations 112 can represent inspection stations. The inspection stations 112 may inspect the indicia printed and optionally cured on the object. For example, following curing, the shuttle may move the object to the downstream inspection station 112 where a camera, infrared sensor, or the like, may inspect the indicia. This inspection can involve examining the color, sharpness, position, orientation, etc. of the indicia on the object to determine whether the indicia was properly and correctly printed onto the object. If the indicia were not properly printed on the object, then the inspection station 112 may generate a notification or alarm for an operator to re-inspect or remove the object, may reject the object and direct the conveyance assembly 102 to move the object 202 out of the printing system 100, or take another responsive action. The inspection station 112 can output an inspection signal to the controller(s) 118 to indicate whether the object 202 is acceptable with proper and correct printing or unacceptable with improper or incorrect printing.

Following inspecting the object at the inspection station 112, the conveyance assembly 102 may move the shuttle to the next downstream station 114. The stations 114 can represent reorienting stations and/or unloading stations. The reorienting stations 114 can change the position or orientation of the objects. For example, the shuttle may hold the object so that the object can be grasped and rotated by the printing stations 106, 108 around or about a first axis. The reorienting station 114 can change the orientation of the object so that the object is held on the shuttle and will be rotated around or about a different, second axis at the subsequent or downstream printing station(s) 106, 108.

Optionally, the stations 114 may additionally or alternatively represent unloading stations 114 where the object can be removed from the printing system 100. For example, if printing on the object is completed by the printing system 100, then the object may be manually removed from the shuttle at the station 114, the shuttle may dump or otherwise eject the object at the station 114, or the like. As another example, if the inspection station 112 determined that the indicia was not properly printed on the object, then the object may be manually removed from the shuttle at the station 114, the shuttle may dump or otherwise eject the object at the station 114, or the like. Optionally, the shuttle holding the object may continue from the station 114 (or may pass the station 114) to the next loading station 104 or may pass the next loading station 104 to continue to the next printing station 106.

The objects may be moved by the conveyance assembly 102 through the various stations 104, 106, 108, 110, 112, 114 until printing on the object during rotation of the object around or about several different axes is completed. In one example, the objects may pass through and have operations performed at each of the stations during one pass through the printing system 100. Alternatively, the objects may pass through and have operations performed on some, but not all the stations. For example, a first object may be loaded into the printing system 100 at the loading station 104A, be printed upon at the printing stations 106A, 108A, have the ink cured at the curing station 110A, be inspected at the inspection station 110A, be reoriented at the reorientation station 112A, pass the loading station 104B, be printed upon at the printing stations 106B, 108B, have the ink cured at the curing station 110B, be inspected at the inspection station 110B, and be removed from the printing system 100 at the reorientation/unloading station 112B. A second object may be loaded into the printing system 100 at the loading station 104C, be printed upon at the printing stations 106C, 108C, have the ink cured at the curing station 110C, be inspected at the inspection station 110C, be reoriented at the reorientation station 112C, pass the loading station 104D, be printed upon at the printing stations 106D, 108D, have the ink cured at the curing station 110D, be inspected at the inspection station 110D, and be removed from the printing system 100 at the reorientation/unloading station 112D. The loading, printing, curing, inspection, and/or reorientation of the first and second objects can occur during the same or overlapping time periods so that the printing system 100 is printing on multiple objects while rotating the objects at the same time.

In another example, an object may be loaded into the printing system 100 at the loading station 104A, be printed upon at the printing stations 106A, 108A, have the ink cured at the curing station 110A, be inspected at the inspection station 110A, be reoriented at the reorientation station 112A, pass the loading station 104B, be printed upon at the printing stations 106B, 108B, have the ink cured at the curing station 110B, be inspected at the inspection station 110B, be reoriented at the reorientation station 112B, pass the loading station 104C, be printed upon at the printing stations 106C, 108C, have the ink cured at the curing station 110C, be inspected at the inspection station 110C, be reoriented at the reorientation station 112C, pass the loading station 104D, be printed upon at the printing stations 106D, 108D, have the ink cured at the curing station 110D, be inspected at the inspection station 110D, and be removed from the printing system 100 at the reorientation/unloading station 112D. This can allow for the object to be printed upon while being rotated around or about more axes.

Figure 2:
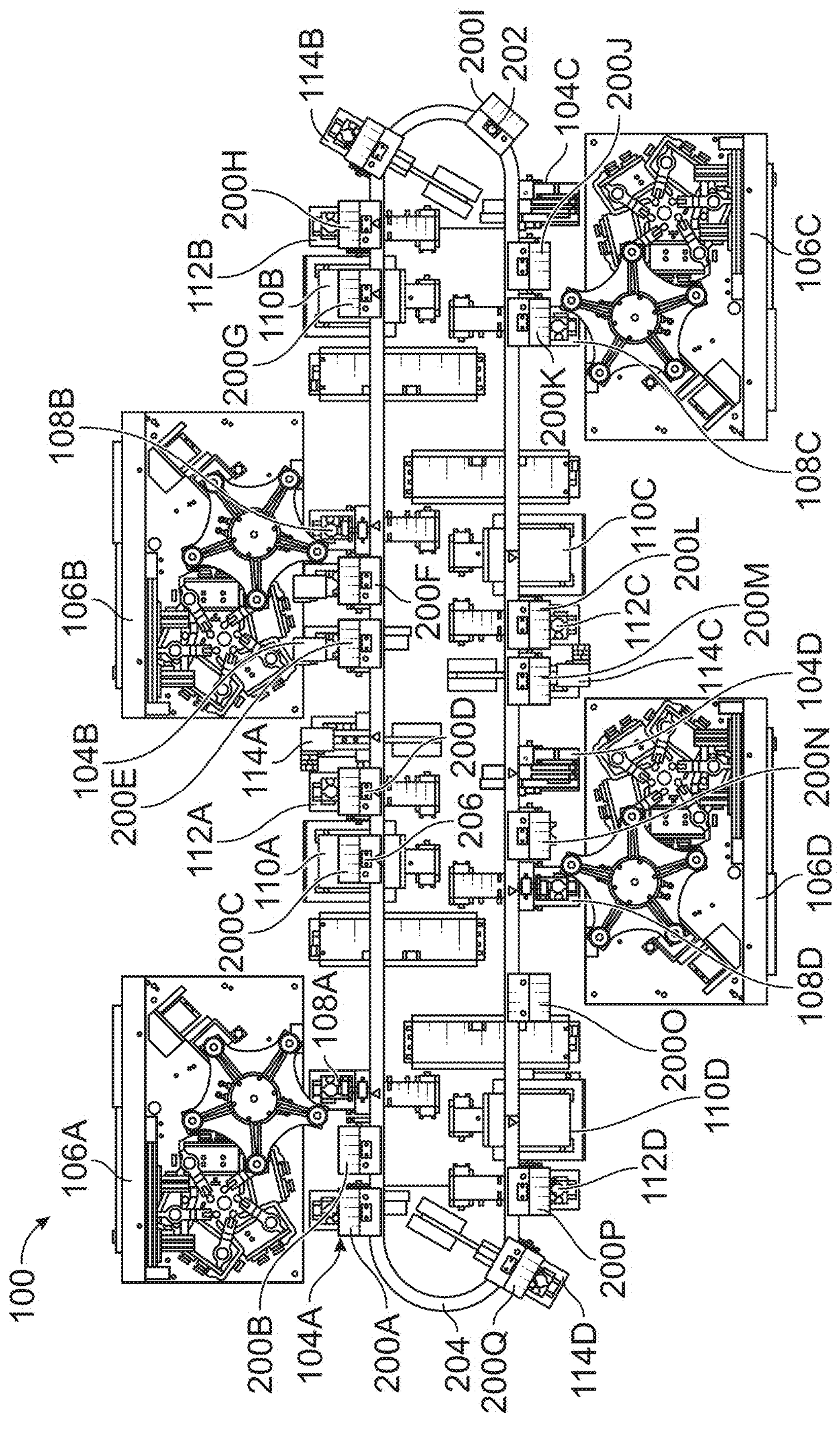
FIG. 2 illustrates an example of the printing system shown in FIG. 1.
Figure 3:
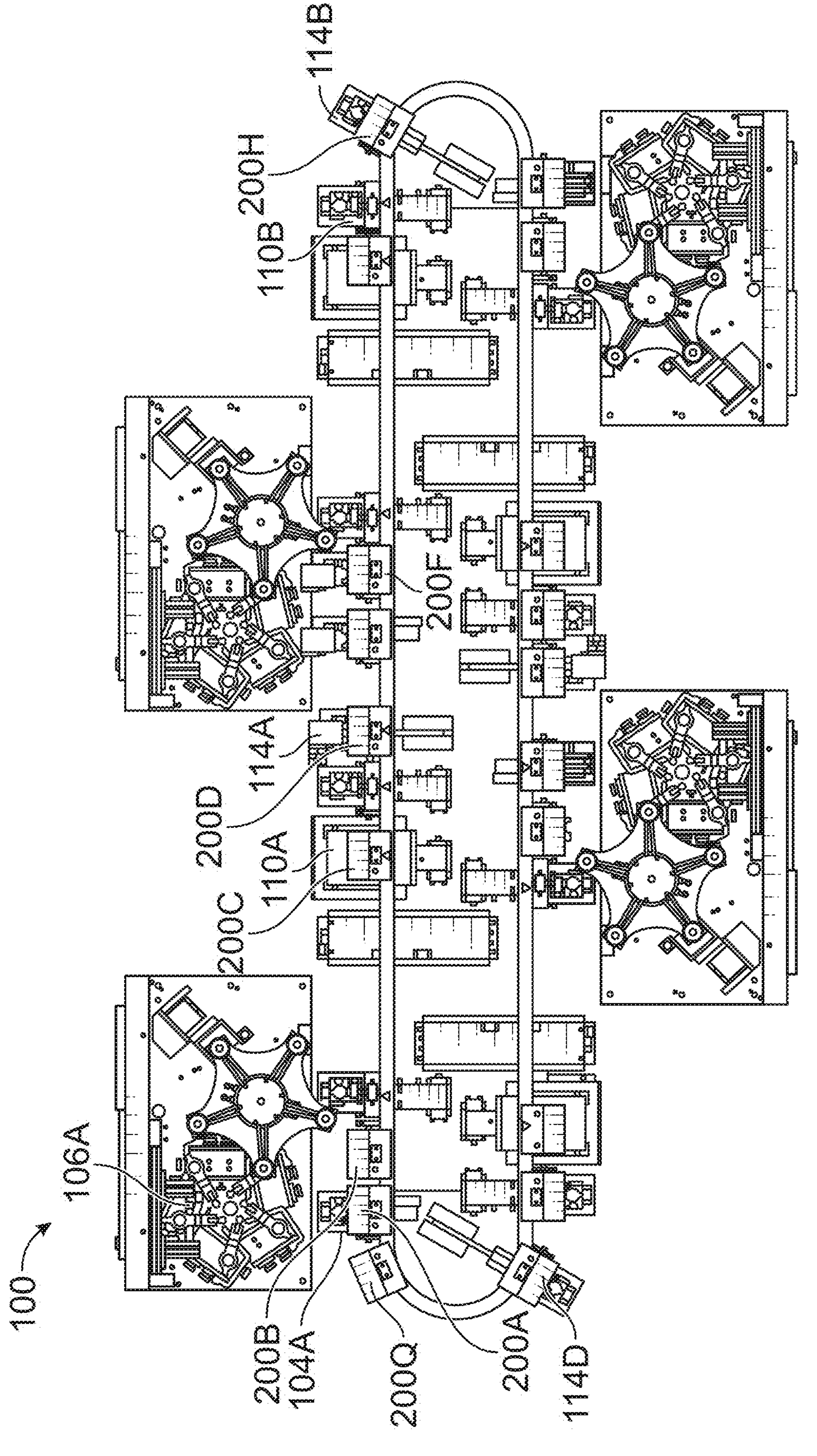
FIG. 3 illustrates an example of the printing system shown in FIG. 1.

FIGS. 2 and 3 illustrate additional examples of the printing system 100 shown in FIG. 1. As described above, the conveyance assembly 102 may include several shuttles 200 that carry, convey, or otherwise move objects 202 through the printing system 100 among or between the different stations 104, 106, 108, 110, 112, 114. Only a single object 202 is shown in FIGS. 2 and 3, but each shuttle 200 may carry a single or multiple objects 202. The shuttles 200 may move along one or more paths 204 defined by tracks, rails, or the like, that extend between or among the different stations 104, 106, 108, 110, 112, 114, 2200. As described above, the path 204 may be a closed loop path (as shown in FIGS. 2 and 3) or may be an open ended path (where there are different starting and terminal ends of the path 204).

The shuttles 200 may include propulsion devices 206 that move the shuttles 200 along the paths 204. The propulsion devices 206 can include electric motors, magnets, or the like, that are powered by move the shuttles 200. The propulsion devices 206 and the stations 104, 106, 108, 110, 112, 114 also may include or represent communication devices that communicate with each other to coordinate movements of the shuttles 200. For example, the shuttles 200 and the stations 104, 106, 108, 110, 112, 114 may include transceivers that wirelessly communicate with each other to direct when and where the shuttles 200 are to move between the stations 104, 106, 108, 110, 112, 114. Alternatively, the shuttles 200 may be pulled or pushed along the paths 204 by chains, pulleys, cables, or the like, that are controlled by one or more of the stations 104, 106, 108, 110, 112, 114, 2200 or a controller (e.g., one or more processors such as microprocessors, integrated circuits, field programmable gate arrays, or the like) that controls motor(s) that pull and/or push on the chains, pulleys, cables, etc.

The shuttles 200 may move independently and/or separate from each other within the printing system 100. For example, each shuttle 200 may move from one station 104, 106, 108, 110, 112, 114 to another station 104, 106, 108, 110, 112, 114 at a different time, at a different speed, or at both a different time and a different speed than another shuttle 200 or than all other shuttles 200. This can permit each shuttle 200 to leave a station 104, 106, 108, 110, 112, 114 responsive to the loading, printing, inspection, or re-orienting of the object 202 carried by that shuttle 200 being completed at the station 104, 106, 108, 110, 112, 114. In contrast, some known printing systems that use a rotating table cannot move an object from one station to another station until the processing or operations performed at each station are completed.

For example, FIG. 2 illustrates several shuttles 200A-Q at different locations in the printing system 100 at a first instance in time. The first shuttle 200A is located at the first loading station 104A to receive a first object 202. The second shuttle 200B is located at the first printing station 106A for printing a first indicia on a second object 202 carried by the second shuttle 200B (e.g., printed at different locations on the second object 202 between rotating the second object 202 around a first axis to different positions). The third shuttle 200C is at the first curing station 110A for curing the first indicia that previously was printed on a third object 202 carried by the third shuttle 200C. The fourth shuttle 200D is at the first inspection station 112A for examining the first indicia previously printed on a fourth object 202 and cured at the first curing station 110A. The fifth shuttle 200E is at the second loading station 104B for receiving a fifth object 202 or for waiting for operations to be completed on the objects 202 held by the shuttles 200F-Q ahead of the fifth shuttle 200E. The sixth shuttle 200F is at the printing station 106B for printing a third indicia on a sixth object 202 carried by the sixth shuttle 200F. The sixth object 202 may have had a first indicia printed on the object 202 at the printing station 106A, a second indicia printed on the object 202 at the printing station 108A, and a third indicia printed on the object 202 at the printing station 106B.

The seventh shuttle 200G is at the curing station 110B for curing the indicia printed on the object 202 carried by the seventh shuttle 200G at the printing station 106B and/or 108B. The eighth shuttle 200H is at the inspection station 112B for inspecting the indicia printed on the object 202 carried by the seventh shuttle 200G at the printing station 106B and/or 108B. The ninth shuttle 200*i* may be moving a ninth object 202 from the re-orienting/unloading station 114B to the printing station 106C. The ninth object 202 may have been re-oriented at the re-orienting/unloading station 114B (as described above) for printing during rotation around or about a different axis at the printing station 106C and/or 108D. Alternatively, the ninth shuttle 200*i* may be moving a ninth object 202 from the re-orienting/unloading station 114B to the printing station 106C. The ninth object 202 may have been re-oriented at the re-orienting/unloading station 114B (as described above) for printing during rotation around or about a different axis at the printing station 106C and/or 108D. Alternatively, the ninth shuttle 200*i* may have unloaded one object 202 at the unloading station 114B and received another object 202 at the loading station 104C.

The tenth shuttle 200J is located at the printing station 106C for printing indicia on a tenth object 202. This tenth object 202 may have been printed upon at the printing stations 106A, 108A, 106B, and/or 108B, or may have been loaded onto the shuttle 200J at the loading station 104C and not yet printed upon by the printing system 100. The eleventh shuttle 200K is located at the printing station 108C for printing indicia on an eleventh object 202. This eleventh object 202 may have been printed upon at the printing stations 106A, 108A, 106B, 108B, and/or 106C, or may have been loaded onto the shuttle 200K at the loading station 104C and not printed upon by the printing stations 106A, 108A, 106B, 108B. The additional shuttles 200 and objects 202 may be at other stations, as shown in FIG. 2.

FIG. 3 illustrates the shuttles 200A-Q at different locations in the printing system 100 at a later, second instance in time. As shown by a comparison between FIGS. 2 and 3, different shuttles 200 may have moved different distances due to the shuttles 200 being independently and/or separately moved in the printing system 100. For example, the shuttle 200Q may have moved from the reorienting/unloading station 114D (where the object 202 carried by the shuttle 200Q was removed or re-oriented) to a location upstream of the loading station 104A (where another object 202 may be loaded onto the shuttle 200Q). The shuttle 200D may have moved to the unloading/reorienting station 114A, the shuttle 200H may have moved from the inspection station 110B to the unloading/reorienting station 114B, and so on. But the shuttle 200A may still be at the loading station 104A, the shuttle 200B may still be at the printing station 106A, the shuttle 200C may still be at the curing station 110A, and so on.

Figure 4:
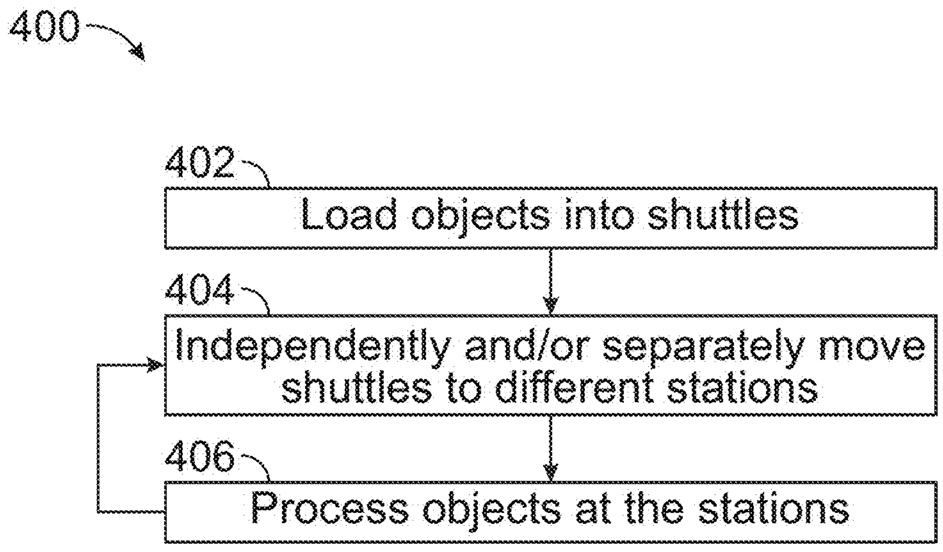
FIG. 4 illustrates a flowchart of one example of a method for printing on objects.

FIG. 4 illustrates a flowchart of one example of a method 400 for printing on objects. The method 400 can represent operations performed by one or more embodiments of the printing system 100 described herein. At 402, objects are loaded onto or into shuttles that carry the objects between or among different stations in the printing system. At 404, the shuttles independently and/or separately carry or move the objects to different stations in the printing system. At 406, processing is performed on the objects at the stations. For example, the objects may be loaded onto the shuttles at loading stations, the objects may be printed upon by printing stations, the indicia printed on the objects may be cured at curing stations, the indicia that is printed and cured may be inspected, the objects may be re-oriented, and/or the objects may be unloaded from the printing system at different stations. Flow of the method 400 can return to 404 where the shuttles again independently and/or separately move the objects to different stations. The method 400 may continue with objects being unloaded from the printing system and/or additional objects being loaded into the printing system. Alternatively, the method 400 may terminate.

This independent and/or separate movement of the shuttles 200 and objects 202 through the printing system 100 may avoid or reduce throughput delays experienced by other printing systems and methods. In contrast to using a rotating table to simultaneously move objects being printed upon between different stations, the printing system 100 may independently and/or separately move the objects 202 between the different stations 104, 106, 108, 110, 112, 114. The independent and/or separate movement of the objects 202 through the printing system 100 may increase throughput of the objects 200 through the printing system 100 by faster stations 104, 106, 108, 110, 112, 114 that are downstream of slower stations 104, 106, 108, 110, 112, 114 to proceed with the processing of the objects 202 to allow those objects 202 to continue moving through and out of the printing system 100. For example, if the printing stations 106, 108 take longer to complete printing on an object 202 than curing the indicia at the curing stations 110, than inspecting the indicia at the inspection stations 112, and/or than unloading/reorienting the objects 202 at the unloading/reorienting stations 114, then the shuttles 200 that are downstream of the slower printing stations 106, 108 may continue moving the objects 202 to and through the faster stations 110, 112, 114. This can prevent objects 202 having printing, curing, and inspection completed on the objects 202 from having to wait to be removed from the printing system 100 while other objects 202 are being printed upon or otherwise processed. This can increase the throughput of the printing system 100 relative to other, known printing systems described herein by increasing the rate at which the objects 202 are input and output by the printing system 100.

Figure 5:
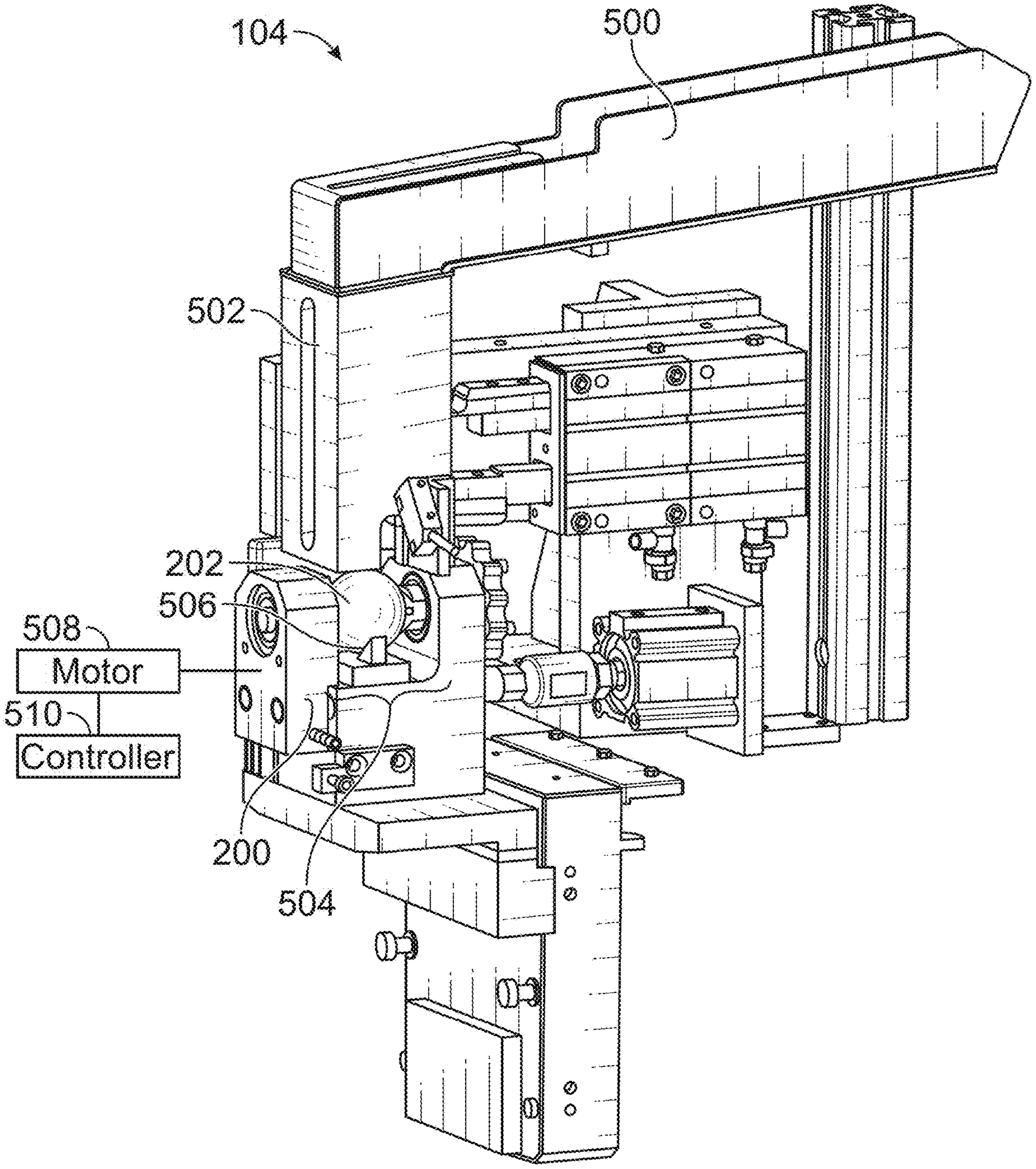
FIG. 5 illustrates one example of the loading station shown in FIGS. 1 through 3.

FIG. 5 illustrates one example of the loading station 104 shown in FIGS. 1 through 3. The loading station 104 may include a first, or angled, chute or conduit 500 that receives a supply of the objects 202. For example, a group of the objects 202 may be loaded into the chute or conduit 500. The chute or conduit 500 is angled so that the objects 202 move toward a second, or vertical, chute or conduit 502. A holding area 504 is at the end of the vertical chute or conduit 502 so that one of the objects 202 is disposed in the holding area 504 while additional objects 202 are in the vertical chute or conduit 502 and, optionally, in the angled chute or conduit 500. A retractable protrusion 506 may rise to hold the object 202 in the holding area 506 and may retract to release the object 202 in the holding area 506 into the shuttle or carriage 200.

The protrusion 506 may be moved by a motor 508 that is controlled by a controller 510. The controller 510 can represent hardware circuitry that includes and/or is connected with one or more processors (e.g., integrated circuits, microprocessors, field programmable gate arrays, etc.) that control operation of the motor 508, the loading station 104, and/or one or more additional stations. When the object 202 in the holding area 506 is released into a carriage or shuttle 200, the next object 202 in the vertical chute or conduit 504 may move (e.g., fall) into the holding area 504. The carriage or shuttle 200 may move into a location at or near this protrusion 506 for receiving the object 202 before moving to the next station.

Figure 6:
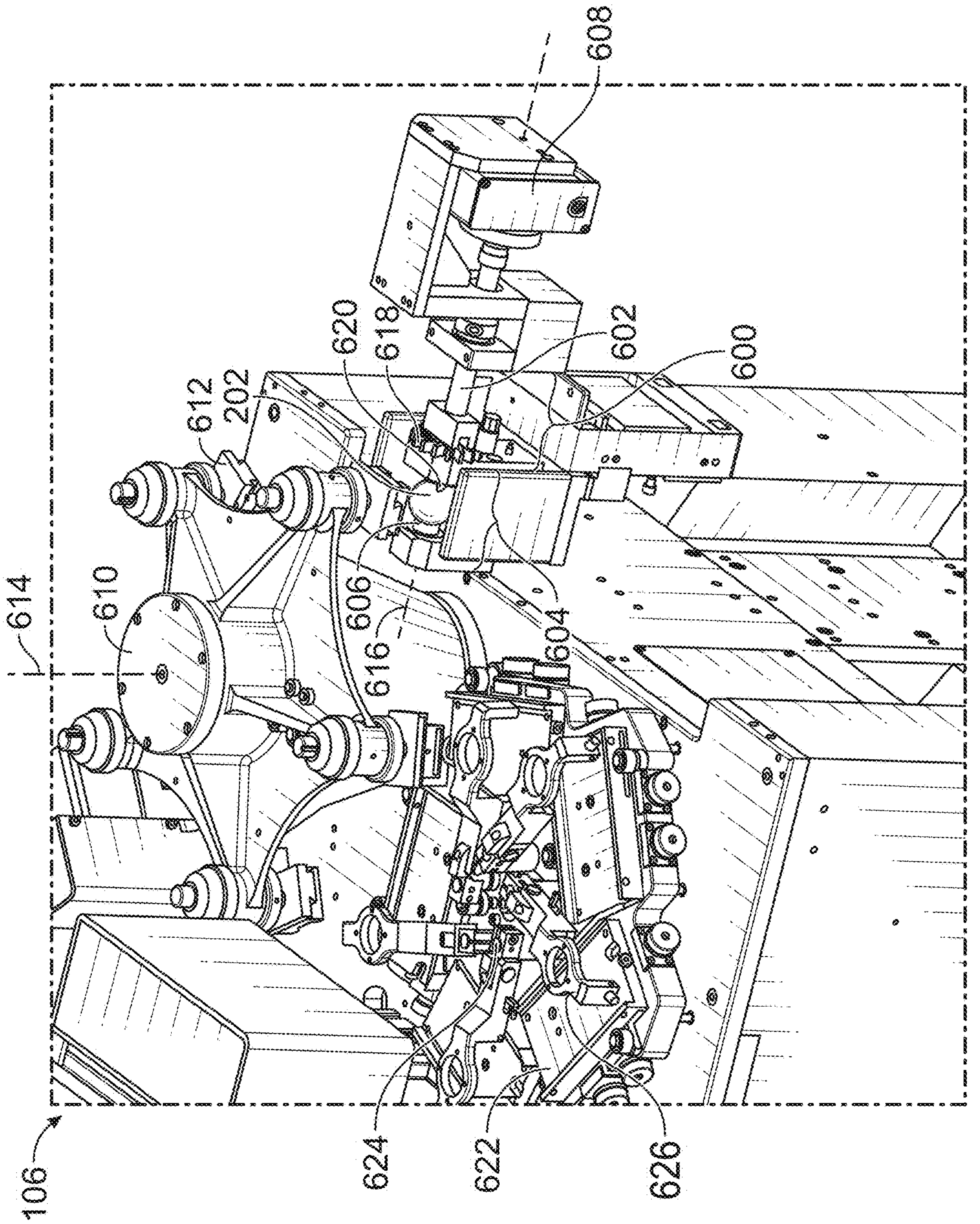
FIG. 6 illustrates one example of the printing station shown in FIGS. 1 through 3.
Figure 7:
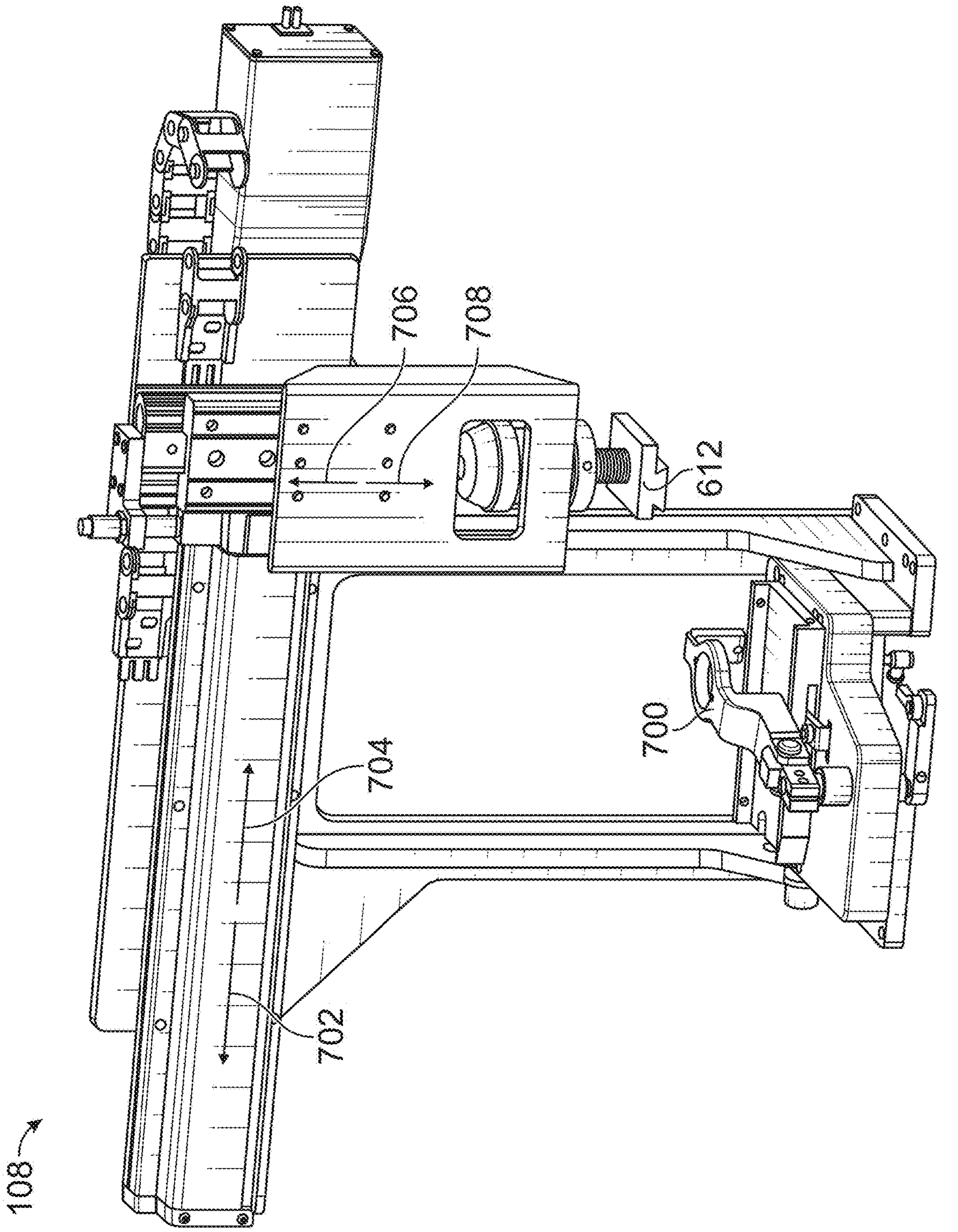
FIG. 7 illustrates one example of the printing station shown in FIGS. 1 through 3.

FIG. 6 illustrates one example of the printing station 106 shown in FIGS. 1 through 3. The shuttle or carriage 200 holding the object 202 may move the object 202 to within a loading zone 600. A motorized arm 602 may engage a rotatable wheel 618 having an end 620 shaped to engage the object 202. For example, the end 620 may have a shape that is complementary to the object 202. With respect to balls or spheres as the objects 202 (e.g., golf balls), the end 620 may have a spherical concave shape. The motorized arm 602 can extend and engage the wheel 618 to move (e.g., push) the object 202 from the loading zone 600 into a printing zone 604 where the object 202 is held against a rotatable body or workpiece 606 by the arm 602. The arm 602 is coupled with a motor 608 that can rotate the arm 602 and the object 202. The motor 608 may be under the control of the controller 510 or another controller. A printing carousel 610 can hold several printing pads 612 that hold ink (or labels). The printing pads 612 can be pressed onto plates 622 on another motorized carousel 624. Each plate 622 may hold ink of a different color, or two or more plates 622 may hold the same color. Motorized arms 626 may hold ink cups and move back and forth across the plates 622 to apply ink from the ink cups to the plates 622 in a pad printing process. The pads 612 may be pressed onto a plate 622 to pick up ink that is then transferred to the object 202 in a pad printing process. While five pads 612 and five plates 622 are shown, alternatively, fewer or more pads 612 and/or plates 622 may be provided. For example, six pads 612 and six plates 622 may be used to apply up to six different colored inks onto the objects 202 (as shown in FIG. 7). The carousel 610 can rotate around or about a printing axis 614 to print different ones of the pads 612 above the object 202.

The motor 608 can rotate the wheel 618 by rotating the arm 602 to rotate the object 202 around or about a different rotation axis 616. The motor 608 can stop rotation of the object 202 and the pad 612 that is currently above the object 202 can lower to transfer ink or a label onto the surface of the object 202. The motor 608 can then rotate the arm 602 again to rotate the object 202 around or about the rotation axis 616 to a different position. The carousel 610 may rotate to bring another pad 612 into position above the object 202. This pad 612 that is currently above the object 202 can lower to transfer ink or a label onto the surface of the object 202, and the process can be repeated until printing on the object 202 by this station 106 is completed. The arm 602 may then retract from the position shown in FIG. 6 to bring the object 202 back into the carriage or shuttle 200 for movement to the next station.

FIG. 7 illustrates one example of the printing station 108 shown in FIGS. 1 through 3. The printing station 108 may include a holding receptacle 700 that holds the object 202 when the object 202 is transferred from the carriage or shuttle 200. Alternatively, the object 202 may remain held in the carriage or shuttle 200 during printing on the object 202 by the printing station 108. The printing station 108 includes a laterally and vertically mobile printing pad 612 that can move in opposite lateral directions 702, 704 and in opposite vertical directions 706, 708. This pad 612 may move under the control of the same or a different controller as the controller 510 and one or more motors. During printing, the pad 612 may laterally move to be disposed above the object 202 and then may move downward toward the object 202 to apply ink or a label onto the object 202. The pad 612 may then vertically move away from the object 202 and/or laterally move away from the object 202. The object 202 can then be taken to another station by the carriage or shuttle 200.

Figure 8:
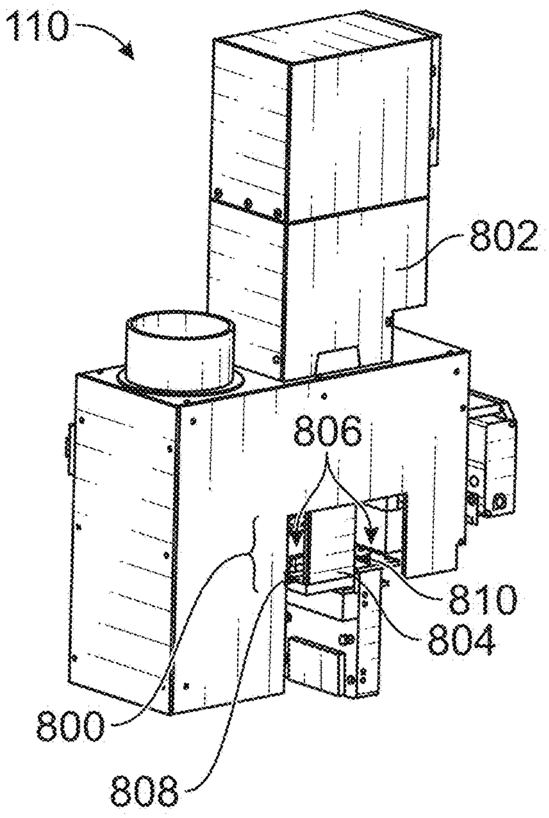
FIG. 8 illustrates one example of the curing station shown in FIGS. 1 through 3.
Figure 20:
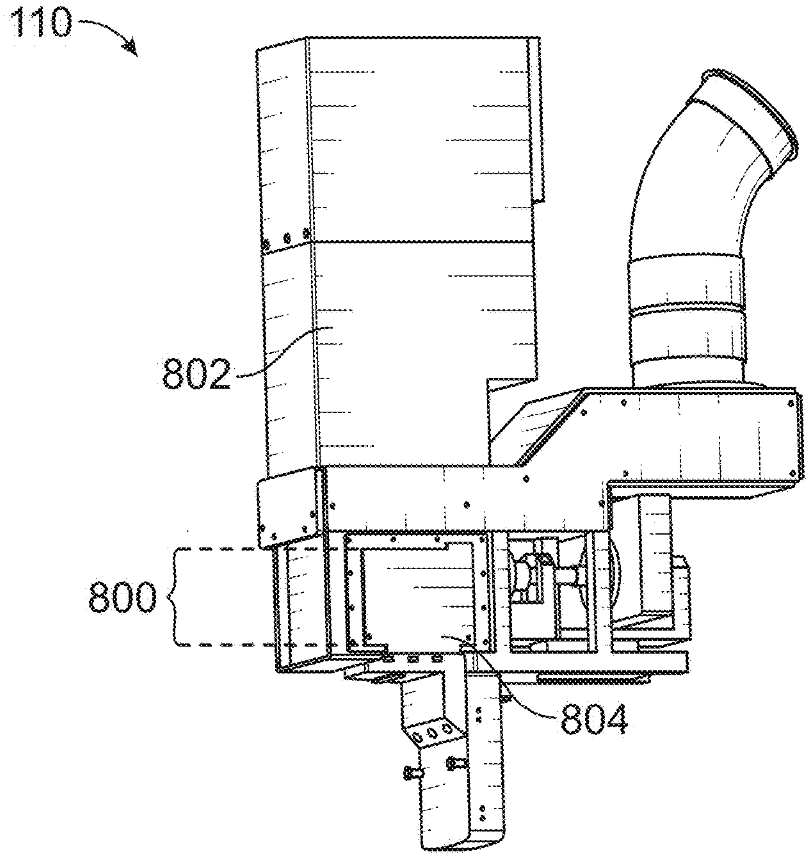
FIG. 20 illustrates another example of the curing station shown in FIG. 8.

FIG. 8 illustrates one example of the curing station 110 shown in FIGS. 1 through 3. The curing station 110 may include a curing area 800 into which the shuttle or carriage 200 moves with the object 202. Alternatively, the object 202 may be transferred from the shuttle or carriage 200 into the curing area 800. An energy source 802 may direct energy (e.g., a lamp that generates UV light, a resistive element that generates heat, etc.) into the curing area 800 and onto the object 202 to cure the ink or label onto the object 202. The curing area 800 may be at least partially enclosed by walls 804 to protect persons, devices, or the like, that are outside of the curing area 800 from the energy generated by the energy source 802). Alternatively, the walls 804 may completely enclose the object 202 and energy source 802 to prevent the energy from the source 802 from escaping the station 110. For example, FIG. 20 illustrates another example of the curing station 110 where the walls 804 are larger to completely enclose the curing area 800 and prevent the energy from being directed outside of the curing station 110. There are no gaps (within manufacturing tolerances) around the walls 804 to prevent leakage of the energy outside of the curing area or volume 800. For example, the curing station 110 shown in FIG. 8 has gaps 806 outside of opposite lateral sides 808, 810 of the walls 804. In contrast, the curing station 110 shown in FIG. 20 does not include these gaps 806. After curing is complete, the object 202 may be reloaded into the shuttle or carriage 200, which then can move the object 202 to the next station.

Figure 9:
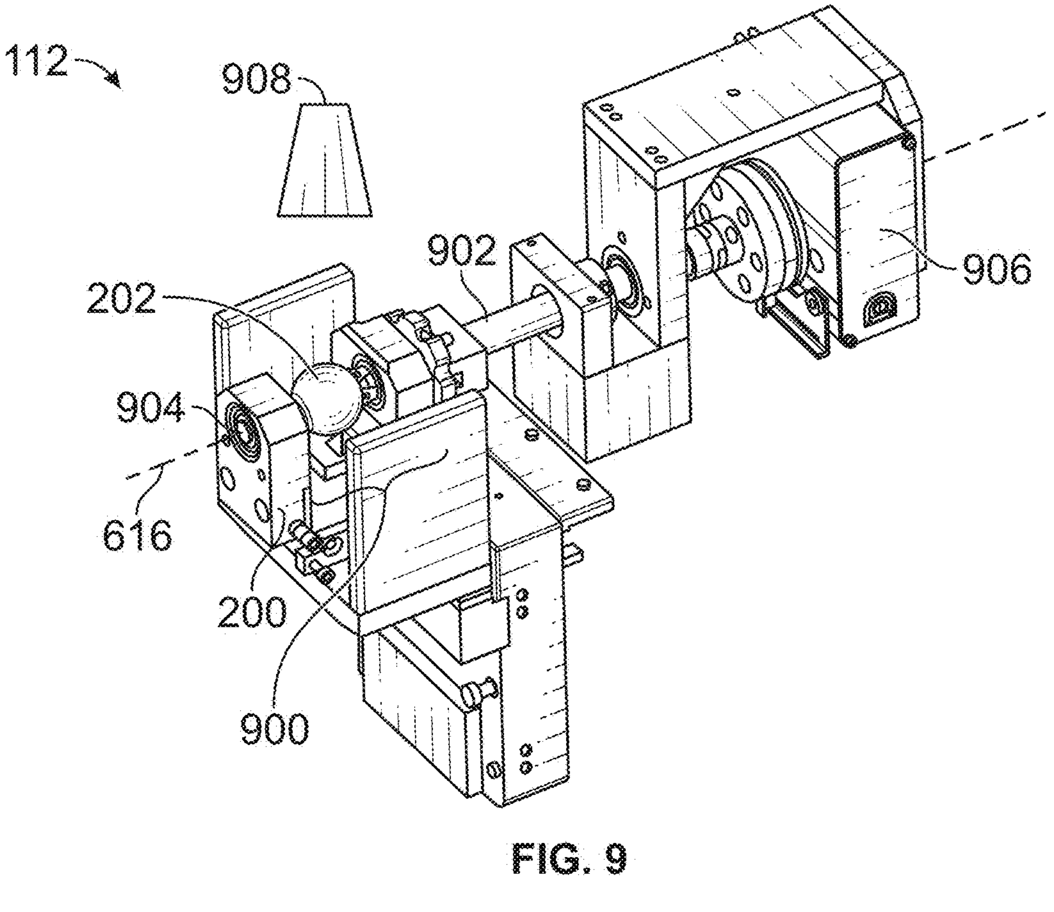
FIG. 9 illustrates one example of the inspection station shown in FIGS. 1 through 3.

FIG. 9 illustrates one example of the inspection station 112 shown in FIGS. 1 through 3. The inspection station 112 may receive the object 202 from the shuttle or carriage 200 into an inspection area 900. A motorized arm 902 may move and/or hold the object 202 against a rotatable body or workpiece 904 by the arm 902. The arm 902 is coupled with a motor 906 that can rotate the arm 902 and the object 902 (e.g., around or about the axis 616). The motor 906 may be under the control of the controller 510 or another controller.

An inspection device 908 may visually inspect the indicia on the object 202. This inspection device 908 may include a camera, infrared sensor, or the like. The motor 906 can rotate the arm 902 to rotate the object 202 around or about the axis 616 while the inspection device 908 examines the indicia. The controller can compare output from the inspection device 908 (e.g., images, infrared levels, or the like) with templates or desired indicia images to ensure that the printed indicia is acceptable, as described above. The arm 902 may then retract from the position shown in FIG. 9 to bring the object 202 back into the carriage or shuttle 200 for movement to the next station.

Figure 10:
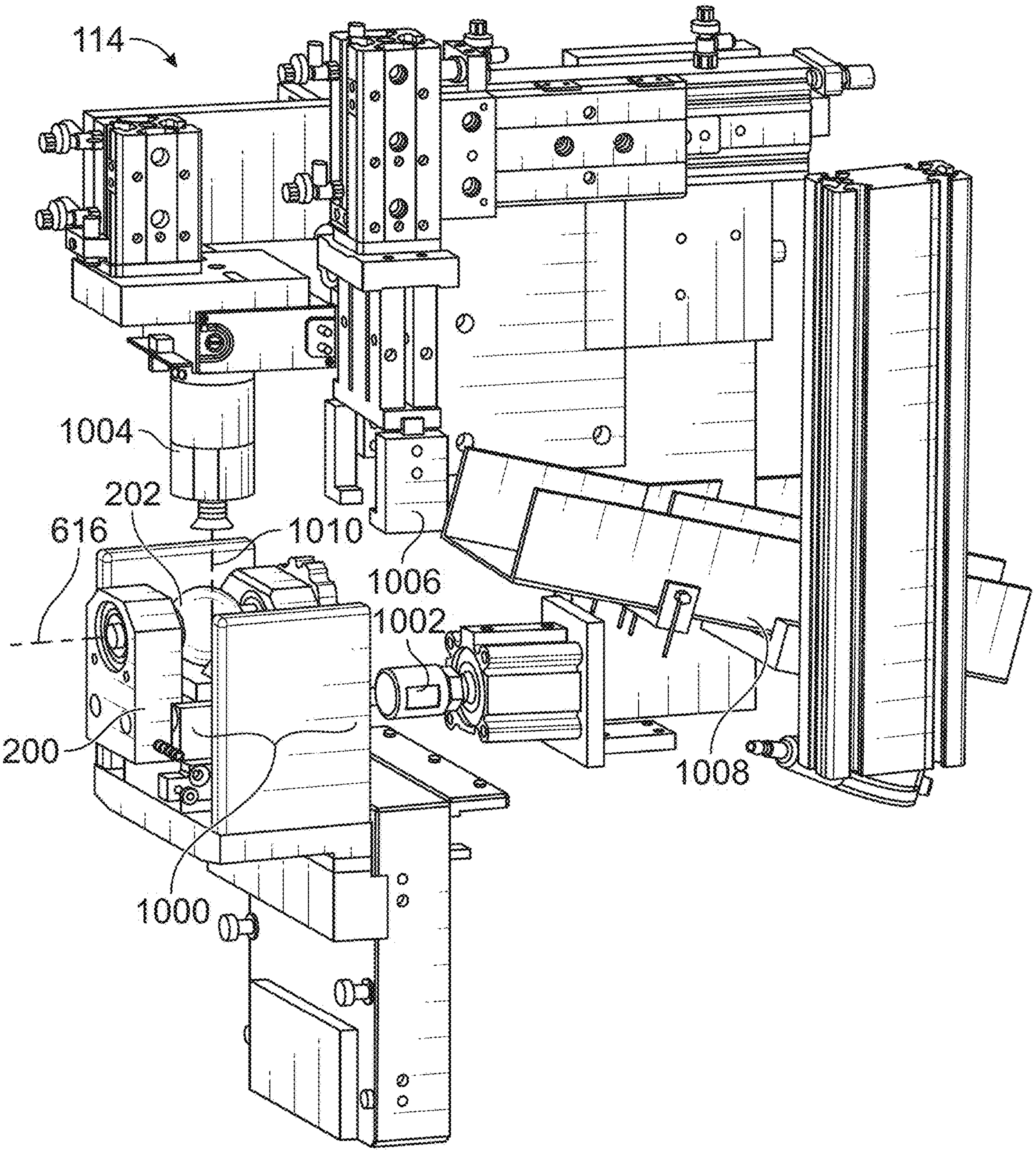
FIG. 10 illustrates one example of the unloading/reorienting station shown in FIGS. 1 through 3.

FIG. 10 illustrates one example of the unloading/reorienting station 114 shown in FIGS. 1 through 3. The shuttle or carriage 200 holding the object 202 may move into a receiving area 1000 of the unloading/reorienting station 114. A motorized arm 1002 may move the object 202 out of the shuttle or carriage 200 along the axis 616 to a position where a rotating arm 1004 can lower to engage the object 202. The rotating arm 1004 may include or be fluidly coupled with a vacuum source that generates vacuum or suction at the end of the rotating arm 1004. This vacuum or suction can engage the object 202 while the motorized arm 1002 retracts from or releases the object 202.

A motor coupled with the rotating arm 1002 can rotate the object 202 around or about a re-orientation axis 1010. This can re-orient the object 202 for additional printing by another printing station 106 and/or 108. For example, prior to the rotating arm 1002 moving the object 202, the rotation axis 616 about or around which the object 202 previously was rotated during printing by the printing station 106 may be oriented along the same direction that the arm 1002 moved the object 202. The rotating arm 1004 may rotate the object 202 so that the prior rotation axis 616 is no longer coextensive or oriented along the direction that the arm 1002 moved the object 202. This may define a new, different rotation axis 616 along the same direction that the arm 1002 moved the object 202, but that is different from the prior rotation axis 616. The object 202 may then be placed back into the shuttle or carriage 200 and moved to another station so that the object 202 can be rotated around or about this new rotation axis 616 for printing.

Optionally, the unloading/re-orienting station 114 may include an unloading arm 1006. The unloading arm 1006 may be connected with the same or different controller that control one or more motors. The unloading arm 1006 can be controlled to lower and grasp the object 202 in the shuttle or carriage 200 and lift the object 202 to an output chute or conduit 1008. The output chute or conduit 1008 may be angled to direct the object 202 out of the station 114 and printing system 100.

Figure 11:
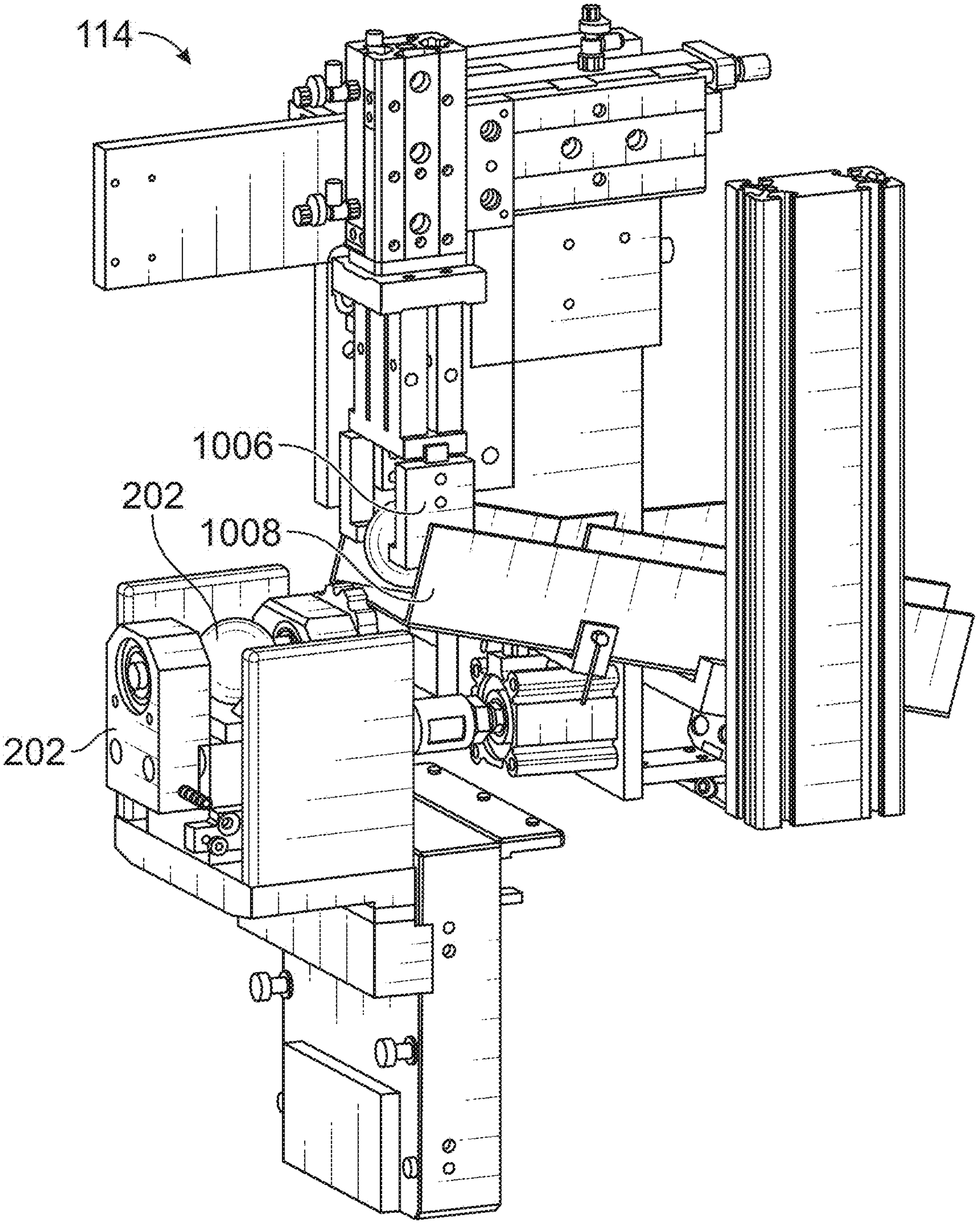
FIG. 11 illustrates another example of the unloading station shown in FIGS. 1 through 3.

FIG. 11 illustrates another example of the unloading station 114 shown in FIGS. 1 through 3. In contrast to the station 114 shown in FIG. 10, the station 114 shown in FIG. 11 may not include the rotating arm 1004 to change the rotation axis about which the object 202 is later rotated during printing. Instead, the unloading station 114 shown in FIG. 11 may include the unloading arm 1006 that lowers and grasps the object 202 in the shuttle or carriage 200 and lifts the object 202 to the output chute or conduit 1008. The output chute or conduit 1008 may be angled to direct the object 202 out of the station 114 and printing system 100.

Figure 12:
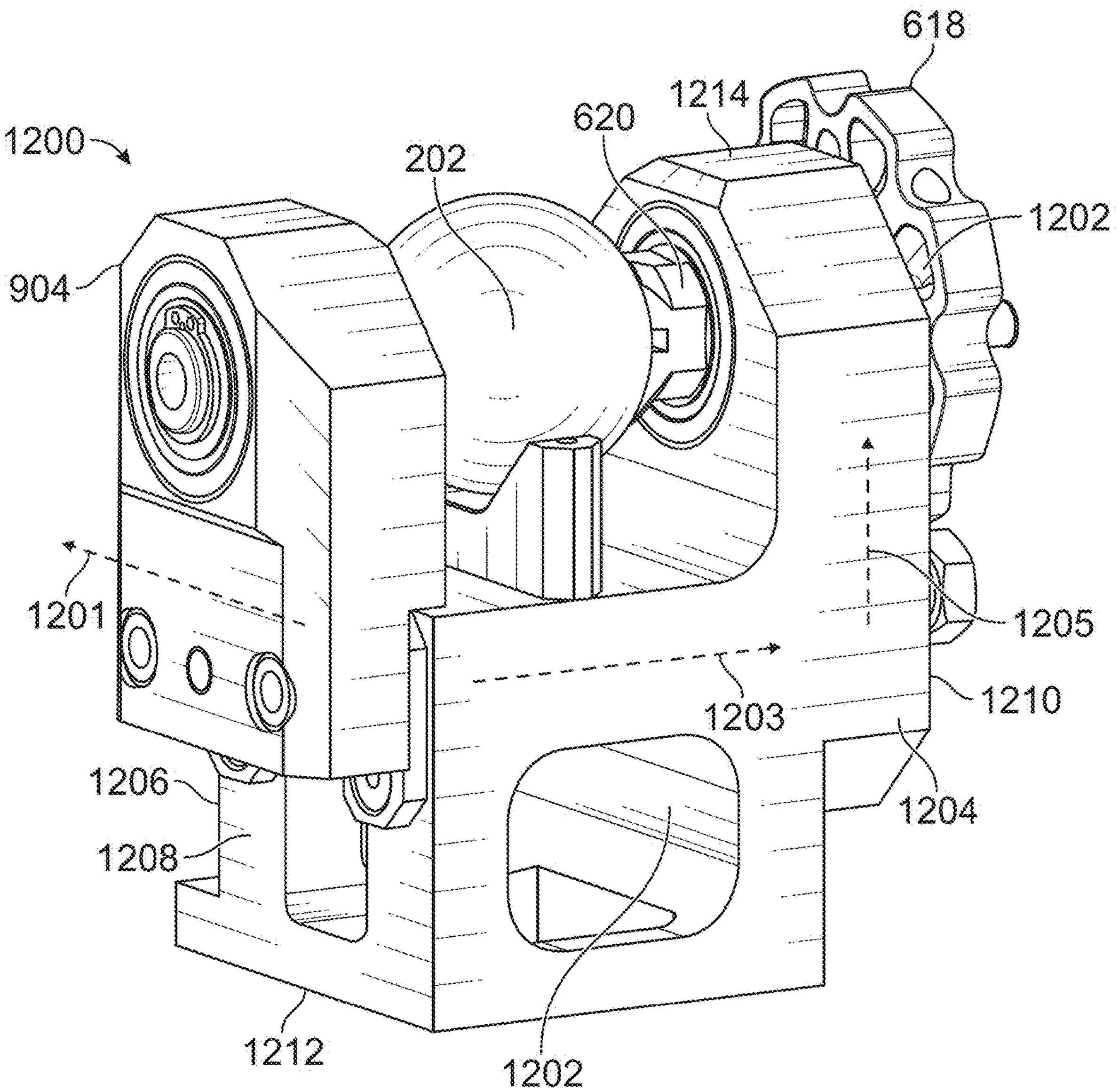
FIG. 12 illustrates a perspective view of another example of a shuttle.
Figure 13:
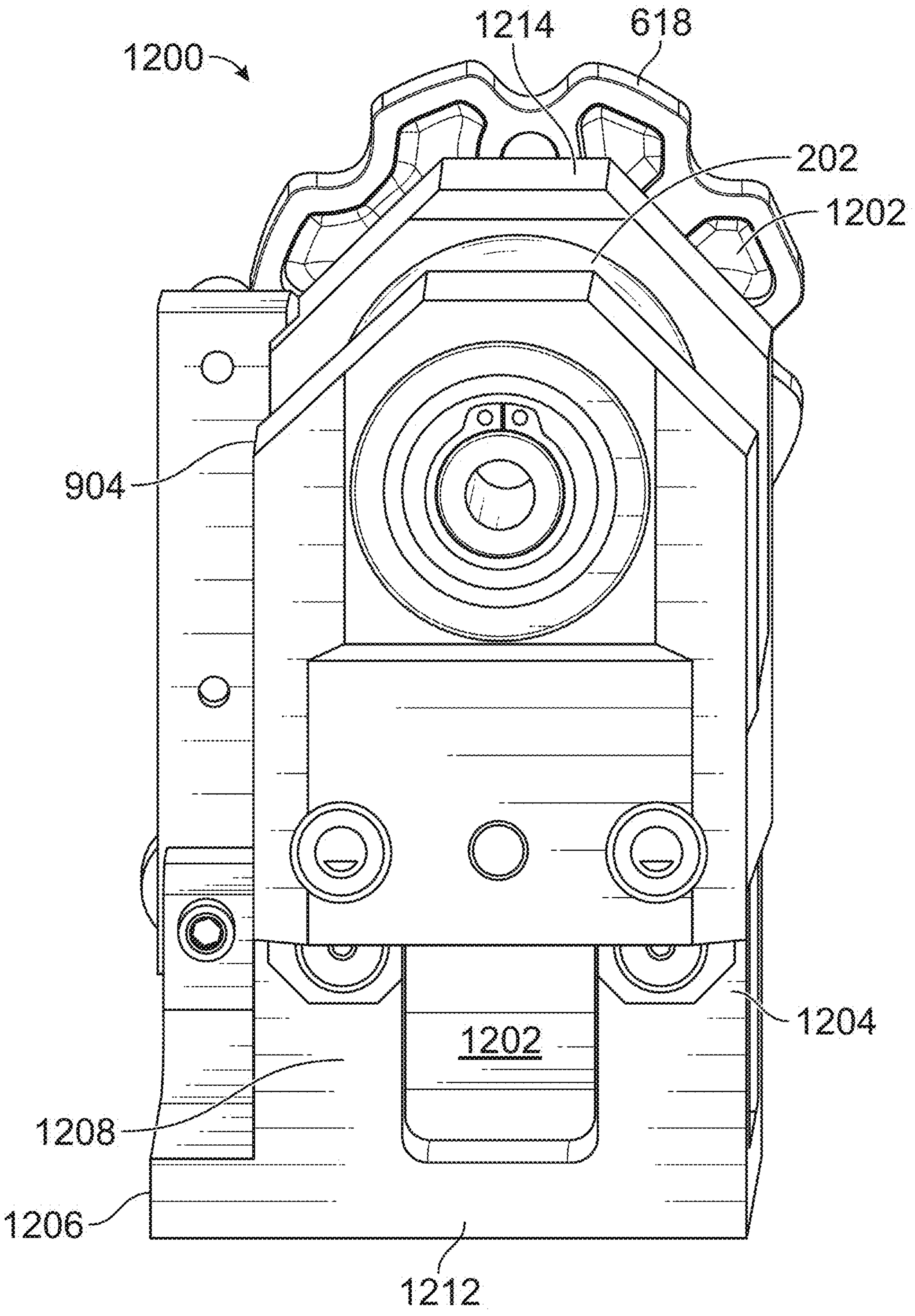
FIG. 13 illustrates a plan view of the shuttle shown in FIG. 12.
Figure 14:
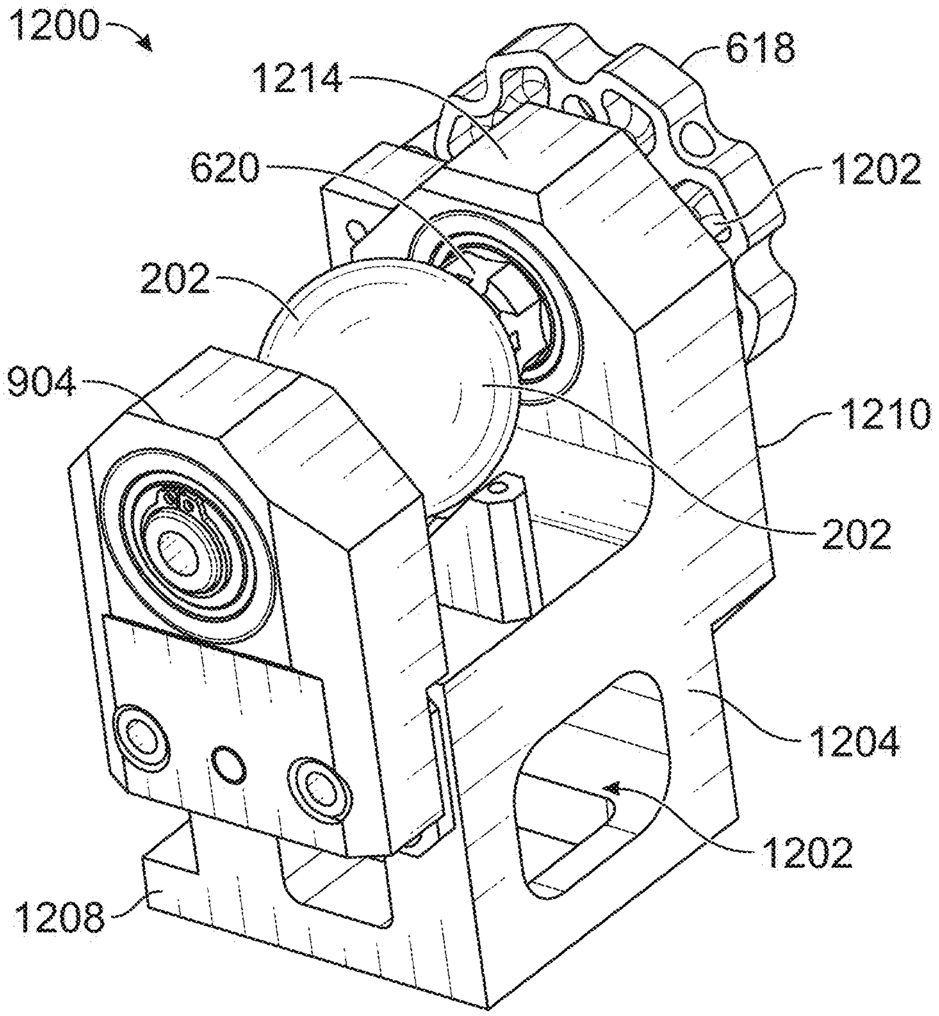
FIG. 14 illustrates another perspective view of the shuttle shown in FIGS. 12 and 13.

FIG. 12 illustrates a perspective view of another example of a shuttle 1200. FIG. 13 illustrates a plan view of the shuttle 1200 shown in FIG. 12. FIG. 14 illustrates another perspective view of the shuttle 1200 shown in FIGS. 12 and 13. The shuttle 1200 can represent one or more of the shuttles 200 described and shown herein. Although several surfaces and components of the shuttle 1200 are labeled in FIGS. 12 through 14 but not in other Figures, the surfaces and components labeled in FIGS. 12 through 14 also are included in the shuttle 200 (but for the voids or cutouts described herein).

One difference between the shuttles 200, 1200 is that the shuttles 200 may be formed from solid blocks or bodies while the shuttles 1200 may include voids or cutouts 1202 within the bodies of the shuttles 1200. For example, the shuttles 200, 1200 may extend in a lateral direction 1201 from one side surface or plane 1204 to an opposite side surface or plane 1206. The shuttles 200, 1200 may extend in a longitudinal direction 1203 from an outward facing surface 1208 to an opposite inward facing surface 1210. The outward facing surface 1208 may face away from the paths 204 and from the other shuttles 200, 1200 while moving along the paths 204. The inward facing surface 1208 may face the paths 204 and/or the other shuttles 200, 1200 while moving along the paths 204.

The shuttles 200, 1200 may extend along a vertical direction 1205 from a bottom surface or side 1212 to an upper surface or side 1214. The lateral, longitudinal, and vertical directions may be perpendicular to each other. The workpiece 904 may be coupled with the outward facing surface 1208 of the shuttle 200, 1200. The wheel 618 and the end 620 (or endpiece) may be connected with each other by a shaft (not visible in FIG. 12) that extends through the shuttle 200, 1200 from the inward facing surface 1210. The wheel 618 and the end 620 are on opposite sides of the inward facing surface 1210 of the shuttle 200, 1200.

The shuttle 200 may be heavier than the shuttle 1200 due to the shuttle 200 having more mass or material than the shuttle 1200. The cutouts or voids 1202 in the shuttle 1200 can reduce the mass of the shuttle 1200 relative to the same sized shuttle 200 that does not include the cutouts or voids 1202. This can allow for the shuttles 1200 to move more rapidly or at greater speeds than the shuttles 200 when the same force is generated by the motors to move the shuttles 200, 1200. But the cutouts or voids 1202 may need to be placed in certain volumes of the shuttle 1200 to ensure the stability and structural integrity of the shuttle 1200. For example, the cutout or void 1202 may be formed as a cuboid volume that is open along each of the lateral surfaces 1204, 1206, the bottom surface 1212, and the outward facing surface 1208. This can maintain the presence of the body of the shuttle 1200 in lateral, vertical, and longitudinal directions, which may be the same directions (or parallel to the same directions) in which forces are imparted on the shuttle 1200 by the printing system.

Alternatively, the cutout or void 1202 may not be open at one or more (or any) of these surfaces 1204, 1206, 1208, 1212. For example, the cutout or void 1202 may be an internal empty volume that is enclosed within the body of the shuttle 1200. Placing the cutout or void 1202 in this location can help maintain the structural integrity and stiffness of the shuttle 1200 compared to having the cutout or void 1202 in other locations, such as within the workpiece 904 or the portion of the shuttle 1200 that is between the wheel 618 and the end 620. In another example, the body of the shuttle 1200 may be additively manufactured to have smaller internal voids, channels, or open volumes throughout the entirety of the body to lessen the mass of the shuttle 1200.

Additional cutouts or voids 1202 may be in the wheel 618. For example, the voids or cutouts 1202 may extend into the wheel 618 from a side of the wheel 618 that faces the inward facing surface 1210 of the shuttle 1200. The cutouts or voids 1202 may extend into the wheel 618 from this side without extending completely through the entire thickness or axial distance of the wheel 618. Placing the cutouts or voids 1202 in these locations can help prevent the arm 602 from getting caught in the cutouts or voids 1202, while still reducing the mass of the shuttle 1200 compared to the shuttle 200. Alternatively, the cutouts or voids 1202 may extend entirely through the axial thickness of the wheel 618. Optionally, the wheel 618 may be additively manufactured to have smaller internal voids, channels, or open volumes throughout the entirety of the wheel 618 to lessen the mass of the shuttle 1200.

Certain operations during object loading, movement of shuttles 200, 1200, printing onto the objects 202, scanning the printed objects 202, and the like, may involve forces being imparted onto the shuttles 200, 1200. For example, loading an object 202 into the shuttle 200, 1200 may involve application of a force in a direction that is opposite the longitudinal direction 1203. Printing onto the object 202 may impart a downward force on the object 202 and the shuttle 200, 1200 in a direction that is opposite the vertical direction 1205. These forces can create misalignments between the shuttles 200, 1200, objects 202, and various stations in the printing system 100. These misalignments can result in printing indicia in incorrect locations, misalignment of printing, misalignment of the shuttles 200, 1200 on the paths 104 (which can interfere with or prevent continued movement of the shuttles 200, 1200), and the like.

Figure 15:
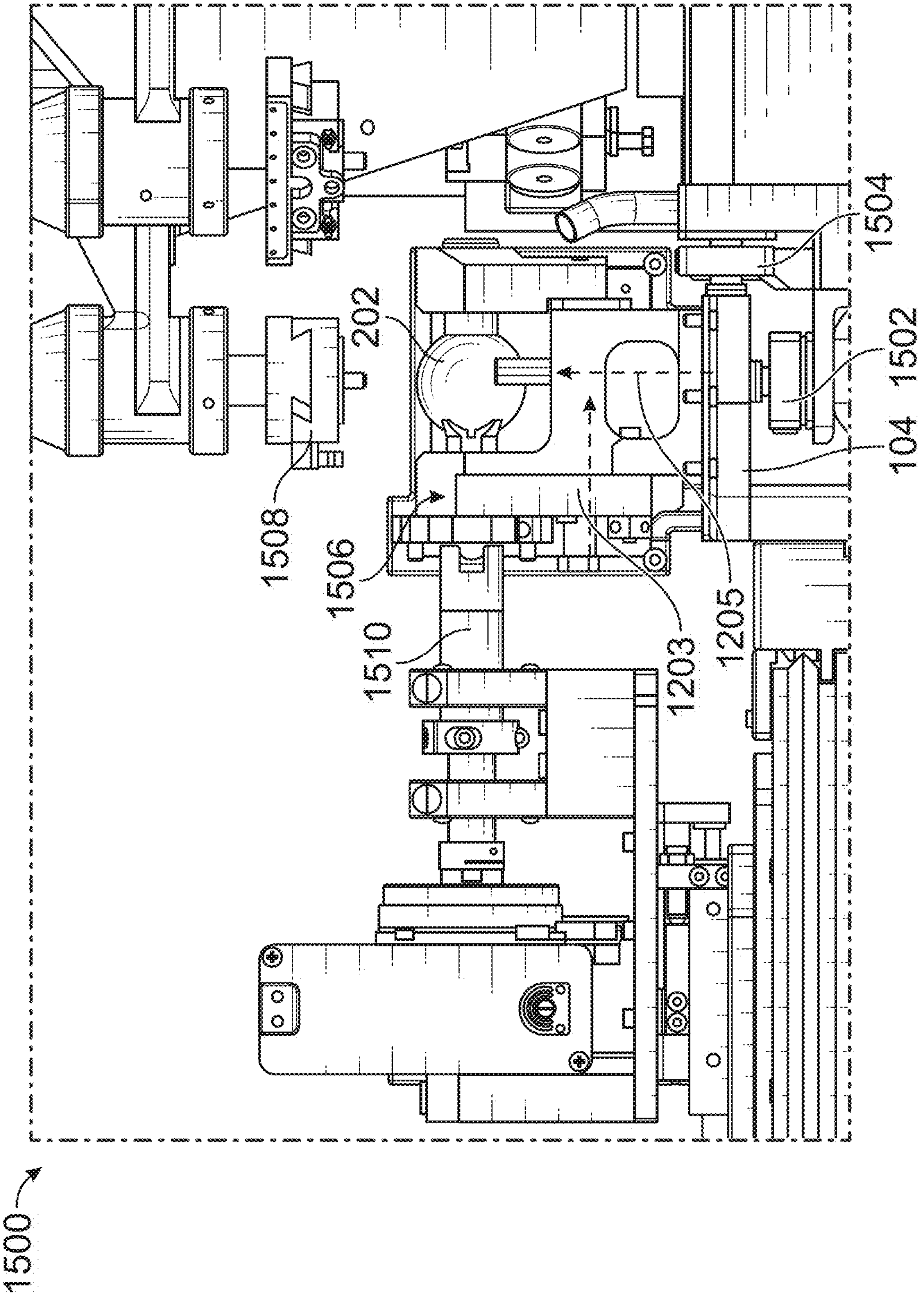
FIG. 15 illustrates one example of a station of the printing system with counter supports positioned to support a shuttle and counteract forces exerted on the shuttle.

To prevent or alleviate these problems, the printing system 100 may include counter supports that support and counteract these forces. FIG. 15 illustrates one example of a station 1500 of the printing system 100 with counter supports 1502, 1504 positioned to support a shuttle 1506 and counteract forces exerted on the shuttle 1506. The station 1500 can represent one of the stations 104, 106, 108, 110, 112, 114 shown in FIG. 1. For example, the station 1500 can represent the reorienting station 114. The shuttle 1506 can represent one of the shuttles 200, 1200. As described above, the shuttle 1506 can self-propel or be propelled along the path 104 to the station 1500.

In operation, the object 202 may be pressed downward by a component 1508 of the station 1500. This component 1508 may be a printing pad 612 of the printing station 106, the rotating arm 1004 of the reorienting station 114, or the like. In the illustrated example, the counter support 1502 (which can be referred to as a vertical counter support 1502) can be beneath the path 104 such that the path 104 is between the vertical counter support 1502 and the shuttle 1506. Alternatively, the vertical counter support 1502 can be between the path 104 and the shuttle 1506. The vertical counter support 1502 may be fixed in position. That is, the vertical counter support 1502 may not move with the shuttle 1506 but remain stationary while the shuttle 1506 moves between the stations.

The vertical counter support 1502 may be a body that can resist the downward force exerted by the component 1508 of the station 1500. The downward movement of the component 1508 and contact with the object 202 can impart a downward force in a direction that is opposite the vertical direction 1205. The vertical counter support 1502 may be a body that is more rigid than the shuttle 1506 and/or the object 202 or may be a resilient body that absorbs the downward force. The vertical counter support 1502 can support the shuttle 1506 from beneath by counteracting this downward force. This can prevent the shuttle 1506 from moving too far downward relative to the path 104 and the station 1500 and becoming misaligned.

The object 202 may be pressed laterally by another component 1510 of the station 1500. This component 1510 may be the motorized arm 602 of the printing station 106, the motorized arm 902 of the inspection station 112, the rotating arm 1002 of the reorienting station 114, or the like. In the illustrated example, the counter support 1504 (which can be referred to as a horizontal or longitudinal counter support 1504) can be between the shuttle 1506 and the station 1500 (e.g., such that the shuttle 1506 is between the horizontal counter support 1504 and the component 1510. The horizontal counter support 1504 may be fixed in position. That is, the horizontal counter support 1504 may not move with the shuttle 1506 but remain stationary while the shuttle 1506 moves between the stations.

The horizontal counter support 1504 may be a body that can resist the lateral force exerted by the component 1508 of the station 1500. The lateral movement of the component 1508 and contact with the object 202 via the shuttle 1506 can impart a longitudinal force in a direction that is along the longitudinal direction 1203. The horizontal counter support 1504 may be a body that is more rigid than the shuttle 1506 and/or the object 202 or may be a resilient body that absorbs the longitudinal force. The horizontal counter support 1504 can support the shuttle 1506 from the side by counteracting this longitudinal force. This can prevent the shuttle 1506 from moving too far inward away from the component 1510 relative to the path 104 and the station 1500 and becoming misaligned.

Figure 16:
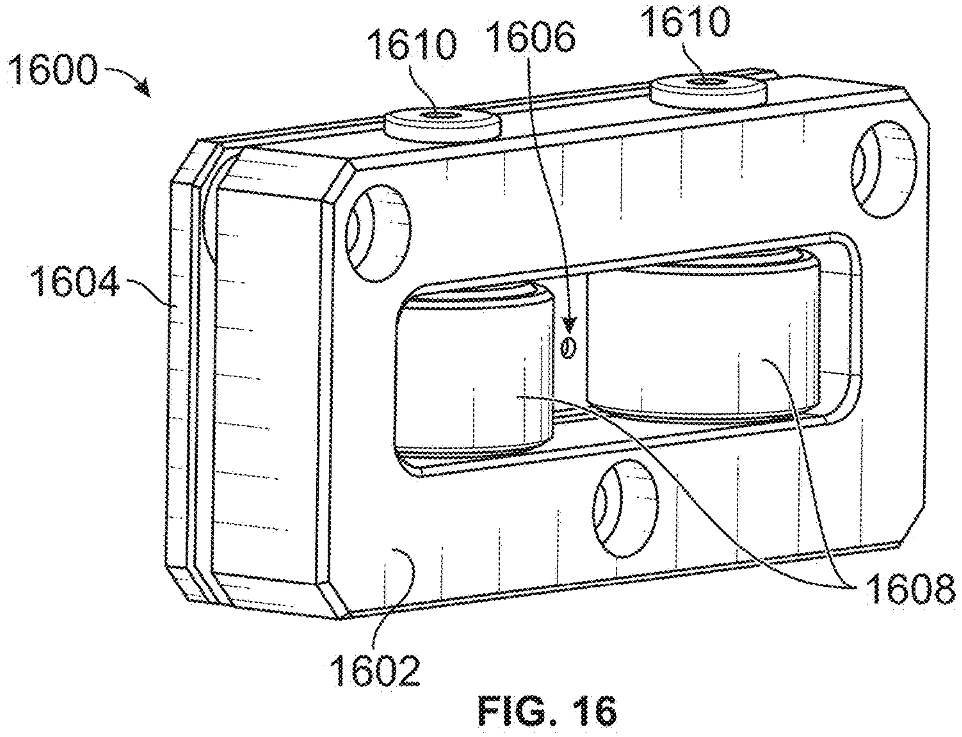
FIG. 16 illustrates a perspective view of one example of a counter support.
Figure 17:
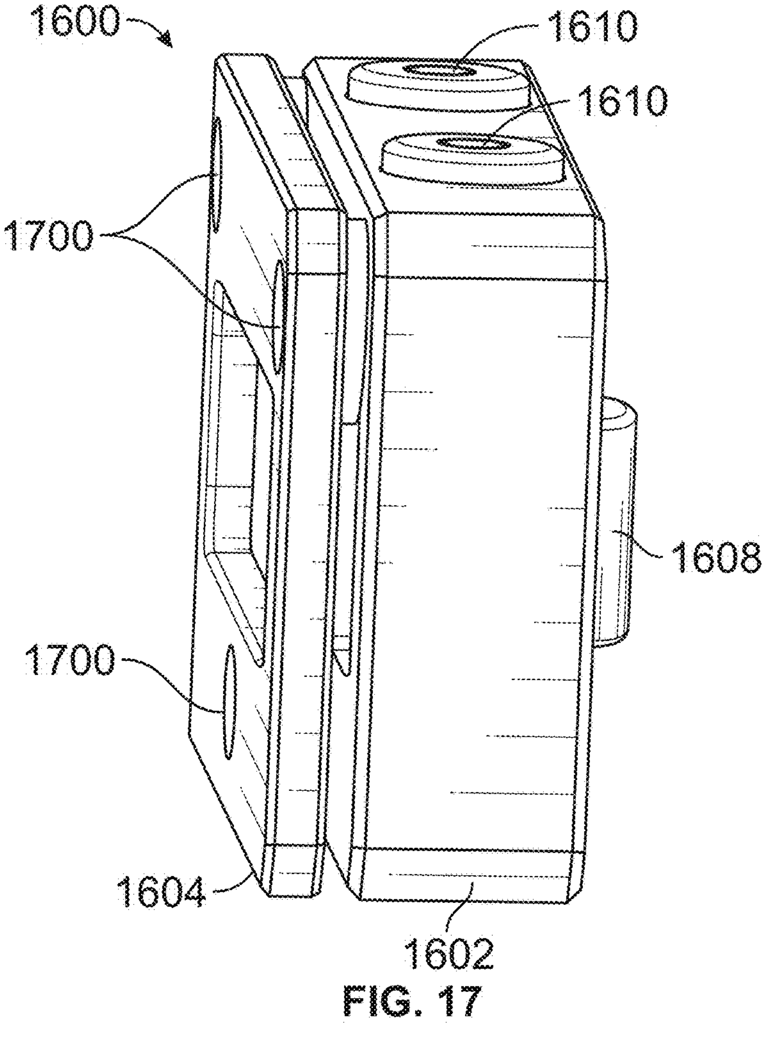
FIG. 17 illustrates another perspective view of the counter support shown in FIG. 16.

FIG. 16 illustrates a perspective view of one example of a counter support 1600. FIG. 17 illustrates another perspective view of the counter support 1600 shown in FIG. 16. This counter support 1600 can represent one or more of the vertical counter support 1502 and/or the vertical counter support 1504 shown in FIG. 15. The counter support 1600 can include an annular body 1602 and a mounting body 1604. Alternatively, the counter support 1600 can be formed from a single body or more than two bodies.

The annular body 1602 extends around and frames an open volume 1606 in which one or more rollers 1608 are located. While two rollers 1608 are shown, alternatively, the counter support 1600 may include a single roller 1608 or more than two rollers 1608. The rollers 1608 are capable of being rotated around shafts 1610 that extend through the annular body 1602 and open volume 1606. These shafts 1610 may be parallel to each other.

The mounting body 1604 may include fastener holes 1700 through which fasteners may extend to couple with the annular body 1602 and/or the printing system 100. These fasteners can hold the counter support 1600 in position relative to a station. The counter support 1600 can be fastened to the station 1500 or printing system 100 with the rollers 1608 facing the shuttle 1506 as the shuttle 1506 enters or leaves the station 1500. The rollers 1608 can reduce friction between the shuttle 1506 and the counter support 1600. This can allow the counter support 1600 to counteract the imparted forces (as described above) while allowing the shuttle 1506 to easily move past the counter support 1600.

Alternatively, the counter support 1600 may not include the open volume 1606 and/or the rollers 1608. The counter support 1600 may be formed from a low friction material or include a low friction coating that allows the shuttle 1506 to easily slide over the counter support 1600. This type of low friction material can be a polymer like high density polyethylene, for example.

Figure 18:
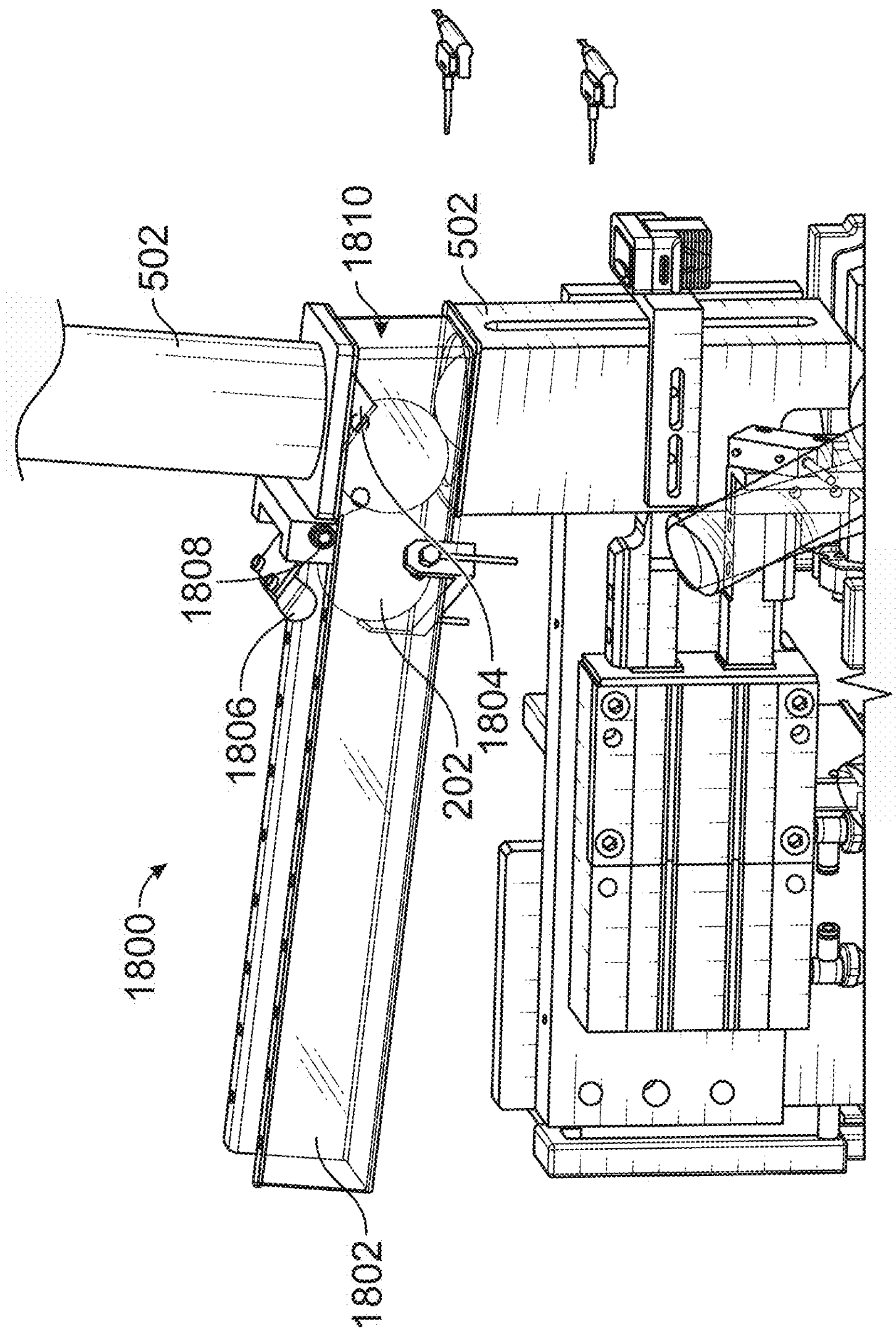
FIG. 18 illustrates a perspective view of one example of a manual loading apparatus.

FIG. 18 illustrates a perspective view of one example of a manual loading apparatus 1800. The manual loading apparatus 1800 can be added to the loading station 104 to allow for one or more objects 202 to be manually loaded into the printing system 100. For example, the manual loading apparatus 1800 can be linked with the vertical conduit 502 of the loading station 104 in a position beneath the angled chute or conduit 500 shown in FIG. 5.

The manual loading apparatus 1800 includes a downwardly angled or pitched chute or conduit 1802 that is connected with the vertical conduit 502. A pivotable gate 1804 is coupled with the conduit 1802 upstream of the intersection between the conduit 1802 and the vertical conduit 502. This gate 1804 includes a counterweight 1806 at one end, with the other end of the gate 1804 disposed within the conduit 1802.

Figure 19:
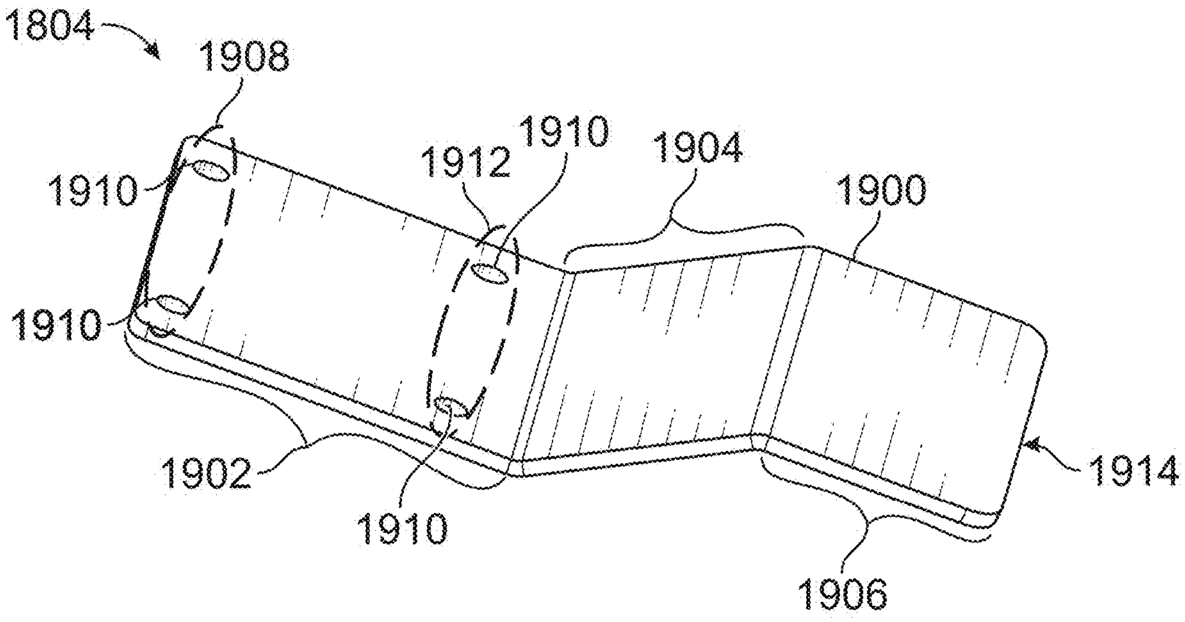
FIG. 19 illustrates a perspective view of one example of a gate shown in FIG. 18.

With continued reference to the manual loading apparatus 1800 shown in FIG. 18, FIG. 19 illustrates a perspective view of one example of the gate 1804 shown in FIG. 18. The gate 1804 may have been formed from a planar body 1900 that is bent or otherwise formed into multiple sections 1902, 1904, 1906. The outer sections 1902, 1906 may be parallel to each other. The middle section 1904 may connect the outer sections 1902, 1906. The outer section 1902 may be disposed outside the conduit 1802 with the counterweight 1806 attached to the end of the outer section 1902. The middle and other outer sections 1904, 1906 may be disposed inside the conduit 1802.

The outer section 1902 may include a first set 1908 of fastener holes 1910 that are connected to the counterweight 1806 by fasteners. A second set 1912 of the fastener holes 1910 in the outer section 1902 may be connected to a pivot shaft 1808 that is mounted outside of the conduit 1802. The gate 1804 may pivot or rotate around or about this pivot shaft 1808.

In operation, the gate 1804 may be in an unbiased state where the gate 1804 is oriented vertically to allow objects 202 in the vertical conduit 502 to move down the vertical conduit 502 and past the gate 1804 to the shuttles below. The gate 1804 may be in this unbiased state due to the pivot shaft 1808 being connected to the gate 1804 in a location that is off-center and closer to the outer section 1902 than the outer section 1906.

When an object 202 is loaded into the conduit 1802, the object 202 may move (e.g., roll) down the conduit 1802 and contact the middle and outer sections 1904, 1906 of the gate 1804. This object 202 can pivot the gate 1804 in a counter-clockwise direction. The counterweight 1806 can assist the object 202 in pivoting the gate 1804 in this direction if the object 202 does not have sufficient mass or force to pivot the gate 1804 without the counterweight 1806. Additionally, the angle of the outer section 1906 of the gate 1804 and the counterweight 1806 can assist in pivoting the gate 1804 in a clockwise direction in FIG. 18 to help prevent or prevent any objects 202 from being wedged or otherwise stuck between the end of the outer section 1906 and the end of the conduit 1802. For example, without the angle of the outer section 1906, an object 202 may roll into a location that is between an end or edge 1914 of the outer section 1906 and an end 1810 of the conduit 1802 and become stuck in that location. With the gate 1804 pivoted to the position shown in FIG. 18, the object 202 can move past the gate 1804 from the conduit 1802 to the lower vertical conduit 502. The object 202 can then proceed down to a shuttle or carriage 200.

Usage of the manual loading apparatus 1800 can assist a user of the printing system 100 to print on individual objects 202 rather than several objects 202 at a time. This can allow the user to test different settings of the printing system 100, different inks, different indicia, or the like.

Figure 21:
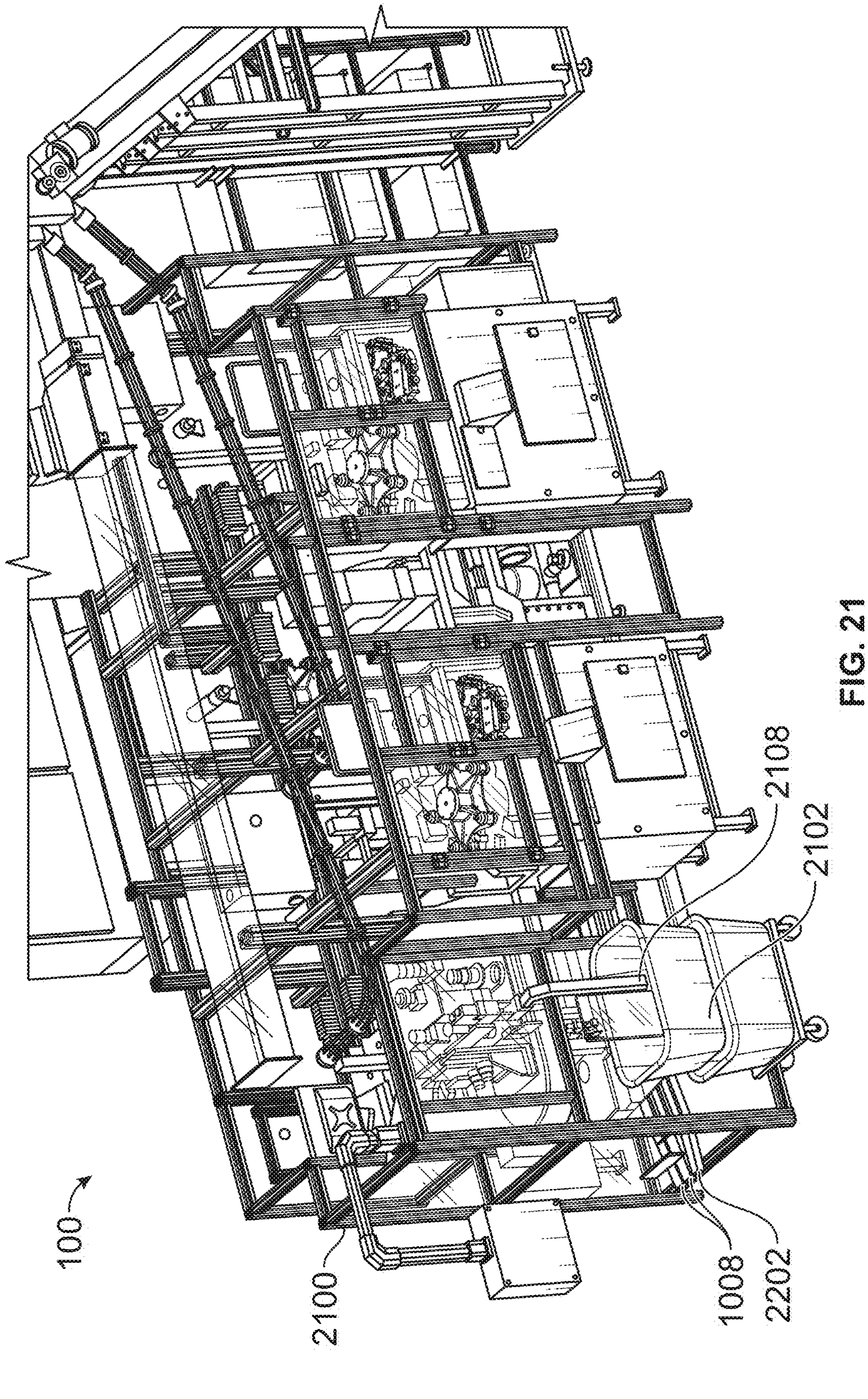
FIG. 21 illustrates another example of the printing system shown in FIGS. 1 through 3.
Figure 22:
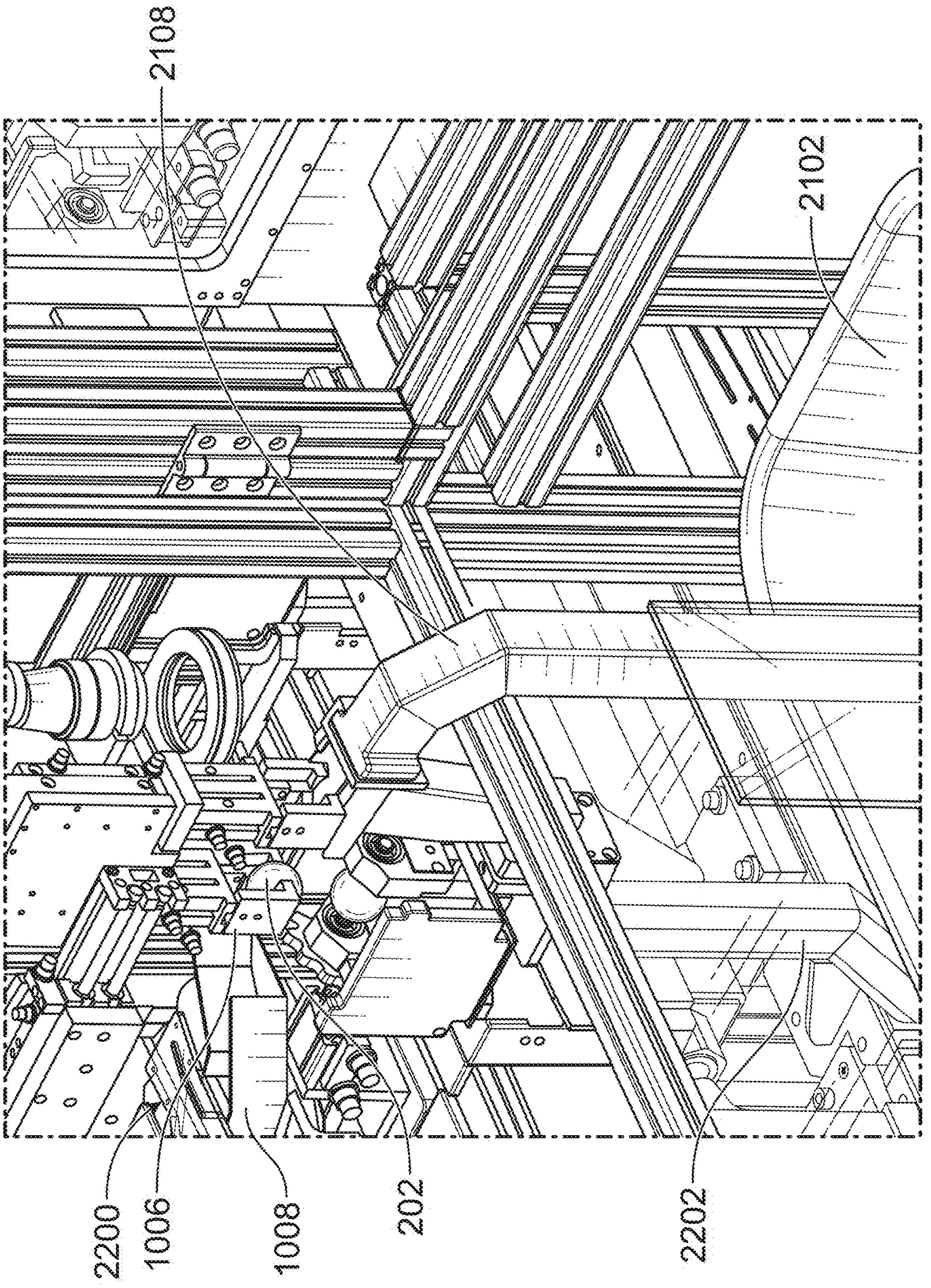
FIG. 22 illustrates one example of a sorting station.

FIG. 21 illustrates another example of the printing system 100 shown in FIGS. 1 through 3. FIG. 22 illustrates one example of a sorting station 2200. The sorting station may be an additional example of one of the stations shown in FIGS. 1 and 2. For example, the sorting station 2200 may replace one or more of the stations, or may be included in addition to the stations shown in FIGS. 1 and 2.

The printing system 100 shown in FIG. 21 has walls 2100 to enclose most of the equipment or parts of the printing system 100. The sorting station 2200 may include the unloading arm 1006 similar to the unloading/re-orienting station 114 that picks the object 202 from the shuttle or carriage 200 and places the object 202 into the output chute or conduit 1008. The output chute or conduit 1008 may extend out of the printing system 100 as shown in FIG. 21. Several output chutes or conduits 1008 are shown as the printing system 100 may include several sorting stations 2200. The arm 1006 of the sorting station 2200 may be controlled by the controller(s) 118 to move the object 202 into the output chute or conduit 1008 responsive to the inspection signal indicating that the object 202 was properly and correctly printed upon. Alternatively, the arm 1006 of the sorting station 2200 may be controlled by the controller(s) 118 to move the object 202 to a rejection chute or conduit 2202 responsive to the inspection signal indicating that the object 202 was not properly or correctly printed upon. The chutes or conduits 1008, 2202 may direct the objects 202 out of the printing system 100 to respective locations, such as locations for packing and shipping the objects 202 that were correctly printed upon, or another location for objects 202 that were not correctly printed upon.

The sorting station 2200 may include an alternate output chute or conduit 2108. This alternate output chute or conduit 2108 may be another path for the object 202 to travel along or through instead of the output chutes or conduits 1008. The alternate output chute or conduit 2108 can be used to manually examine the objects 202 that were loaded using the manual loading apparatus 1800 shown in FIG. 18. For example, after an object 202 is loaded via the manual loading apparatus 1800, printed upon, and cured (as described above), the unloading/re-orienting station 114 may pick and place the object 202 into the alternate output chute or conduit 2108 instead of one of the output chutes or conduits 1008, 2202. The alternate output chute or conduit 2108 may direct the object(s) 202 to another location.

For example, the alternate output chute or conduit 2108 may direct the object 202 to a closer location to the printing system 100, such as a bin 2102 that receives the object 202. This can allow an operator to manually load an object 202 into the printing system 100, have the printing system 100 print inks onto the object 202 and cure the inks, and then unload the object 202 into the bin 2102 for manual inspection or other usage of the object 202. This can prevent the object 202 from being included in or intermixed with other objects 202, such as objects 202 that are not being used to test different settings of the printing system 100.

In one example, a printing system is provided that may include plural stations that load objects to be printed upon into the printing system, print indicia on the objects, cure the indicia printed on the objects, inspect the indicia printed on the objects, re-orient the objects, and/or unload the objects from the printing system. The printing system also may include a conveyance assembly extending between the stations. The conveyance assembly may independently and/or separately move the objects between or among the stations.

The conveyance assembly may move the objects different distances between the stations at the same time. The conveyance assembly may move the objects at different speeds between the stations at the same time. The conveyance assembly may include self-propelled shuttles that move the objects between or among the stations.

The conveyance assembly may move the objects between or among the same stations but at different speeds, different times, or both different speeds and different times. The stations may include a first printing station that prints the indicia on the objects between rotation of the objects around or about a first axis to different positions. The stations may include a second printing station that prints the indicia on the objects between rotation of the objects around or about a second axis that is different from the first axis.

A method for printing also is provided. The method may include two or more of loading objects to be printed upon into the printing system, printing indicia on the objects, curing the indicia printed on the objects, inspecting the indicia printed on the objects, re-orienting the objects, and/or unloading the objects from the printing system. The method also may include independently or separately moving the objects between or among the stations.

The objects may be moved different distances between the stations at the same time. The objects may be moved at different speeds between the stations at the same time. The objects may be moved by self-propelled shuttles. The objects may be moved between or among the same stations but at different speeds, different times, or both different speeds and different times.

The method also may include printing the indicia on the objects between rotation of the objects around or about a first axis to different positions. The method may include printing the indicia on the objects between rotation of the objects around or about a second axis that is different from the first axis.

In another example, a printing system is provided that may include stations configured to two or more of load objects to be printed upon into the printing system, print indicia on the objects during rotation of the objects around different axes, cure the indicia printed on the objects, inspect the indicia printed on the objects, re-orient the objects, or unload the objects from the printing system. The printing system also may include a conveyance assembly extending between the stations. The conveyance assembly may include shuttles that one or more of independently or separately move the objects between or among the stations such that the objects are moved different distances, different speeds, or both different distances and different speeds between or among the stations at a same time.

The shuttles may be self-propelled. The stations may include a first printing station that prints the indicia on the objects between rotation of the objects around or about a first axis to different positions. The stations may include a second printing station that prints the indicia on the objects between rotation of the objects around or about a second axis that is different from the first axis. The objects may include golf balls. The conveyance assembly may include a closed loop path along which the shuttles move the objects.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related.

Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A printing system configured to print onto objects, the printing system comprising:

plural stations including at least:

a first printing station configured to receive a first object of the objects, rotate the first object around a first axis, and print first indicia onto the first object in multiple different first locations around the first object while rotating the first object at the first printing station; and a second printing station configured to receive the first object after the first object leaves the first printing station, rotate the first object around a second axis that differs from the first axis, and print the first indicia or different, second indicia onto the first object in the first locations or multiple different second locations around the first object while rotating the first object at the second printing station; and a conveyance assembly extending between the first printing station and the second printing station, the conveyance assembly configured to one or more of independently or separately move the objects between or among the first printing station and the second printing station.

2. The printing system of claim 1, wherein the stations include one or more additional stations configured to load the objects into the printing system, cure the first indicia or the second indicia, inspect the first indicia or the second indicia, re-orient the objects, or unload the objects into the printing system, wherein the conveyance assembly is configured to move the objects one or both of different distances or different speeds between the stations at a same time.

3. The printing system of claim 1, wherein the conveyance assembly includes self-propelled shuttles that move the objects between or among the stations.

4. The printing system of claim 1, wherein the conveyance assembly includes shuttles that individually move individual ones of the objects between the stations, the shuttles including mass-reducing cutouts or voids in bodies of the shuttles.

5. The printing system of claim 1, wherein the conveyance assembly includes shuttles that individually move individual ones of the objects between the stations, and further comprising:

counter supports fixed at one or more of the stations, the counter supports configured to engage the shuttles at the one or more of the stations to counteract forces exerted onto the shuttles by the stations.

6. The printing system of claim 5, wherein the counter supports includes one or more horizontal counter supports and one or more vertical counter supports, the one or more horizontal counter supports positioned to counteract the forces exerted onto the shuttles in horizontal directions by the stations, the one or more vertical counter supports positioned to counteract the forces exerted onto the shuttles in vertical directions by the stations.

7. The printing system of claim 6, wherein the counter supports include annular bodies with one or more rollers disposed within the annular bodies.

8. The printing system of claim 1, further comprising:

a manual loading apparatus configured to receive one or more of the objects that are manually loaded into the printing system, the manual loading apparatus including a pivoting gate having a counterweight, the pivoting gate and the counterweight configured to alternate between allowing automatically loaded ones of the objects and the one or more of the objects that are manually loaded to enter into the conveyance assembly.

9. The printing system of claim 8, wherein the pivoting gate includes a downwardly angled outer portion disposed at an end of a conduit, the outer portion downwardly angled to prevent the one or more of the objects from being stuck between an end of the pivoting gate and an end of the conduit.

10. The printing system of claim 1, wherein at least one of the stations includes an energy source configured to direct energy toward the objects to cure the indicia printed on the objects, the at least one of the stations having the energy source also including walls that completely enclose the objects within the at least one of the stations while the energy source directs the energy toward the objects, the walls preventing leakage of the energy out of the at least one of the stations.

11. The printing system of claim 1, wherein at least one of the first printing station or the second printing station is configured to print the first indicia or the second indicia using pad printing with at least five different colored inks.

12. The printing system of claim 1, further comprising:

output chutes configured to direct the objects out of the printing system once printing, curing, and inspection of the indicia on the objects is completed; and an alternate chute configured to direct at least one of the objects out of the printing system and into a bin for manual inspection of the at least one of the objects.

13. The printing system of claim 1, wherein the first printing station is configured to print the first indicia on the first object using a first color, the second printing station is configured print the second indicia on the first object in the second locations using a second color, and wherein the first indicia differs from the second indicia, and the first locations differ from the second locations.

14. A method for pad printing on objects, the method comprising:

receiving a first object of the objects at a first printing station of multiple stations in a pad printing system;

rotating the first object around a first axis at the first printing station;

printing first indicia onto the first object at the first printing station in multiple different first locations around the first object while rotating the first object at the first printing station;

independently or separately moving the objects including the first object between or among the stations including between or among the first printing station and a second printing station of the stations using a conveyance assembly extending between the stations;

rotating the first object around a second axis that differs from the first axis at the second printing station; and printing the first indicia or different, second indicia on the first object in the first locations or multiple different second locations around the first object while rotating the first object at the second printing station.

15. The method of claim 14, wherein the objects are moved different distances between the stations at a same time by the conveyance assembly.

16. The method of claim 14, wherein the objects are moved at different speeds between the stations at a same time by the conveyance assembly.

17. The method of claim 14, wherein the objects are moved by self-propelled shuttles of the conveyance assembly.

18. The method of claim 14, wherein the first indicia are printed on the first object using a first color, and the second indicia are printed on the first object in the second locations at the second printing station using a second color.

19. A printing system comprising:

a first printing station configured to receive objects, rotate each of the objects around a first axis, and print first color indicia on different first locations around each of the objects during rotation of each of the objects around the first axis;

a second printing station configured to receive the objects after printing the first color indicia on the objects at the first printing station, the second printing station configured to rotate each of the objects around a second axis that is different from the first axis, and print second color indicia that is different from the first color indicia on different second locations around each of the objects during rotation of each of the objects around the second axis, the second locations on each of the objects being different from the first locations on each of the objects; and a conveyance assembly extending between the first printing station and the second printing station, the conveyance assembly including shuttles configured to one or more of independently or separately move the objects between or among the first printing station and the second printing station such that the objects are moved different distances, different speeds, or both different distances and different speeds between or among the first printing station and the second printing station at a same time.

20. The printing system of claim 19, wherein the objects include golf balls.

* * * * *